United States Patent [19]

Dixon

[11] E Re. 28,608

[45] Reissued Nov. 11, 1975

[54] AUTOMATIC ASSEMBLY MACHINE

[75] Inventor: Paul H. Dixon, Belvidere, Ill.

[73] Assignee: Babette Dixon as Trustee of a trust identified as Paul H. Dixon Trust dated Jan. 28, 1975, Rockford, Ill.

[22] Filed: Apr. 8, 1974

[21] Appl. No.: 458,716

Related U.S. Patent Documents

Reissue of:

[64] Patent No.: 3,675,302
Issued: July 11, 1972
Appl. No.: 96,329
Filed: Dec. 9, 1970

[52] U.S. Cl. ..... 29/211 R; 29/240
[51] Int. Cl. ..... B23q 7/10; B23p 19/04
[58] Field of Search.. 29/211 R, 240, 211 D, 208 R, 29/208 D

[56] References Cited

UNITED STATES PATENTS

| | | | |
|---|---|---|---|
| 3,279,045 | 10/1966 | Dixon | 29/211 R |
| 3,583,451 | 6/1971 | Dixon | 29/240 X |
| 3,675,302 | 7/1972 | Dixon | 29/211 R |

*Primary Examiner*—Thomas H. Eager
*Attorney, Agent, or Firm*—Wolfe, Hubbard, Leydig, Voit & Osann, Ltd.

[57] ABSTRACT

Screws fed from a hopper to an elongated delivery track by a feeding drum are picked up one-by-one from the track by a transfer device and are delivered to a chuck which surrounds a power rotated and power reciprocated screwdriver for driving the screws into a workpiece.

32 Claims, 24 Drawing Figures

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

INVENTOR.
PAUL H. DIXON,
BY
Wolfe, Hubbard, Leydig, Voit & Osann
ATTORNEYS.

AUTOMATIC ASSEMBLY MACHINE

Matter enclosed in heavy brackets [ ] appears in the original patent but forms no part of this reissue specification; matter printed in italics indicates the additions made by reissue.

BACKGROUND OF THE INVENTION

This invention relates to an automatic assembly machine for driving threaded fasteners into a workpiece and, more particularly, to a machine which includes a power rotated fastener driver adapted to be reciprocated through downward and upward strokes. Machines of this general type are shown in Dixon U.S. Pat. Nos. 2,989,996 and 3,279,045.

During the downward stroke of the driver of the machine, a fastener held in a chuck is engaged by the driver and is threaded into the workpiece. Before the next downward stroke of the driver, a transfer mechanism picks up another fastener from an elongated delivery track and positions the fastener adjacent the chuck, the fasteners being delivered to the track in randomly oriented positions by a power rotated feeding wheel which scoops the fasteners from a supply hopper and drops the fasteners onto the track. A rotatable clearing wheel is positioned above the track and sweeps improperly oriented fasteners off of the track and back into the hopper so that only properly oriented fasteners are allowed to proceed along the track to the transfer mechanism for delivery to the chuck.

SUMMARY OF THE INVENTION

The general aim of the present invention is to provide a new and improved machine of the above character which is simpler in construction than prior machines and which, at the same time, is more reliable and trouble-free in service use. In large, the foregoing ends are achieved through the provision of a machine whose various operating mechanisms are constructed in a novel manner so as to be more independent of one another than has been the case heretofore so that each mechanism may be adjusted and timed as necessary without significantly affecting the other mechanisms and requiring retiming of the overall machine.

A further object is to drive the feeding and clearing wheels in a simplified manner in timed relation with reciprocation of the driver and to uniquely effect rotation of the wheels at the most advantageous rate for optimum feeding and clearing of the fasteners.

Another object of the invention is to provide the machine with a new and improved fastener-holding chuck which positively telescopes downwardly over and grips each fastener delivered by the transfer mechanism, the chuck coacting with the transfer mechanism at the end of each cycle and gripping the fastener prior to the next downward stroke of the driver so that the transfer mechanism can be retracted well clear of the driver before the latter is advanced through its downward stroke.

A further aim is to reciprocate the driver and to drive the transfer mechanism with separate actuators to reduce the complexity of the machine, outward movement of the transfer mechanism being governed by upward movement of the driver through the provision of a simplified mechanical interlock between the transfer mechanism and the driver.

The invention further resides in the novel and simplified construction of the transfer mechanism to keep the mechanism from moving away from the delivery track until a fastener has been picked up and to keep the mechanism for moving away from the chuck until the fastener has been released.

Still another object of the invention is to provide the machine with a new and simplified finder device which coacts with a novel workpiece-holding fixture to properly locate the driver relative to the workpiece in quicker and easier manner than has been possible heretofore.

These and other objects and advantages of the invention will become apparent from the following detailed description taken in connection with the accompanying drawings.

DETAILED DESCRIPTION

Figure 1:
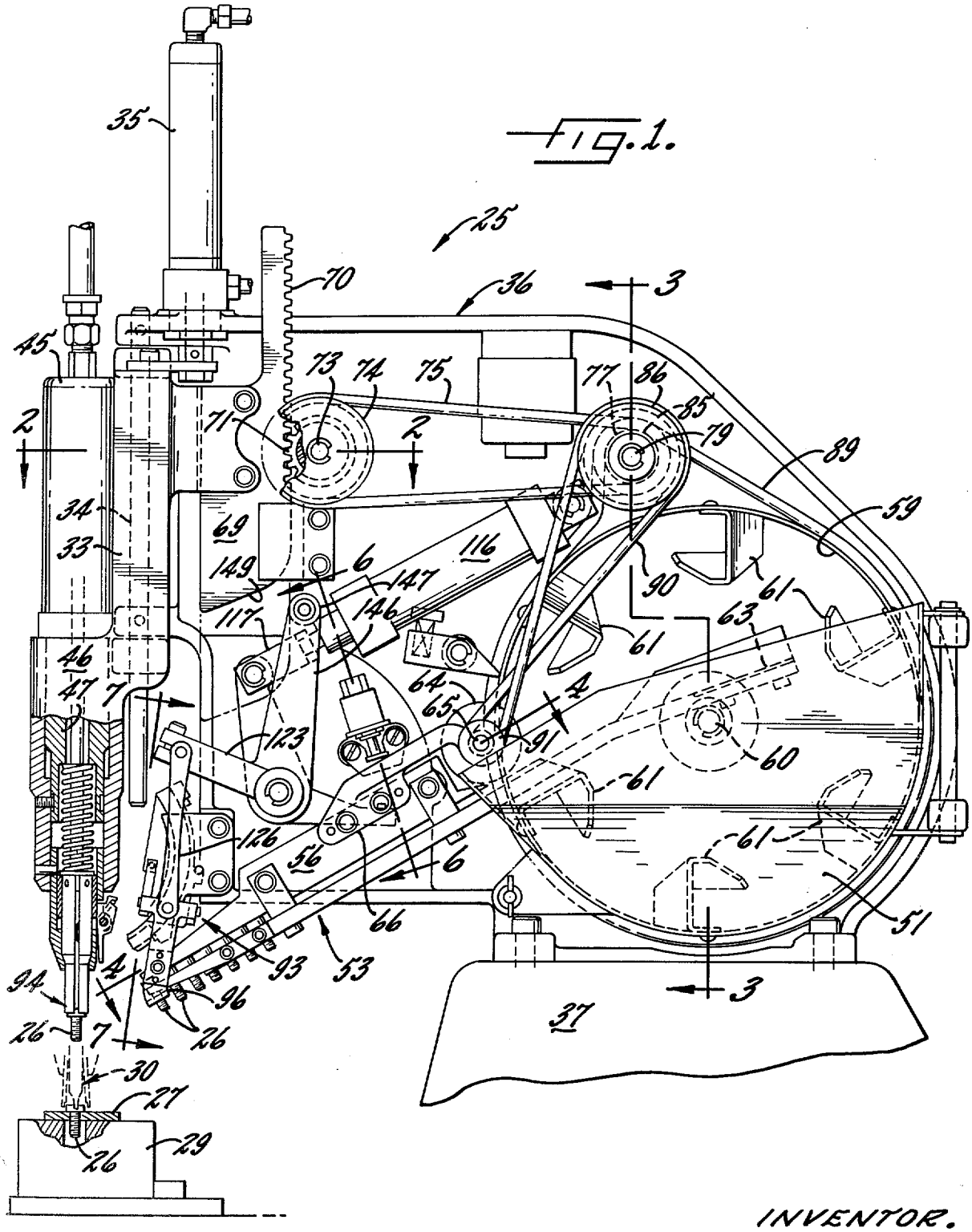
FIG. 1 is a fragmentary side elevation of a new and improved machine embodying the novel features of the present invention.

As shown in the drawings for purposes of illustration, the invention is embodied in an automatic assembly machine 25 operable to drive threaded fasteners 26 (FIG. 1) into a workpiece 27 held by a fixture 29. While the machine is capable of driving fasteners of various types, the fasteners have been illustrated herein as being slotted-head screws which are adapted to be driven by a power rotated and power reciprocated tool in the form of a screwdriver 30 (FIG. 12) having a blade-like tip 31.

Figure 2:
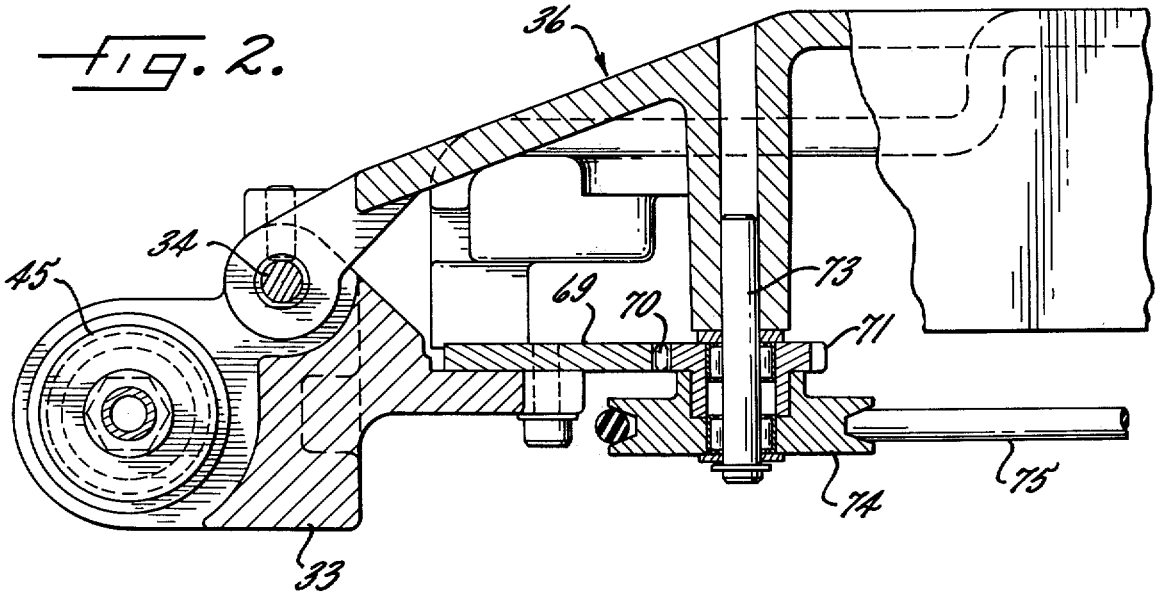
FIGS. 2, 3 and 4 are enlarged fragmentary cross-sections taken substantially along the lines 2—2, 3—3 and 4—4, respectively, of FIG. 1.
Figure 3:
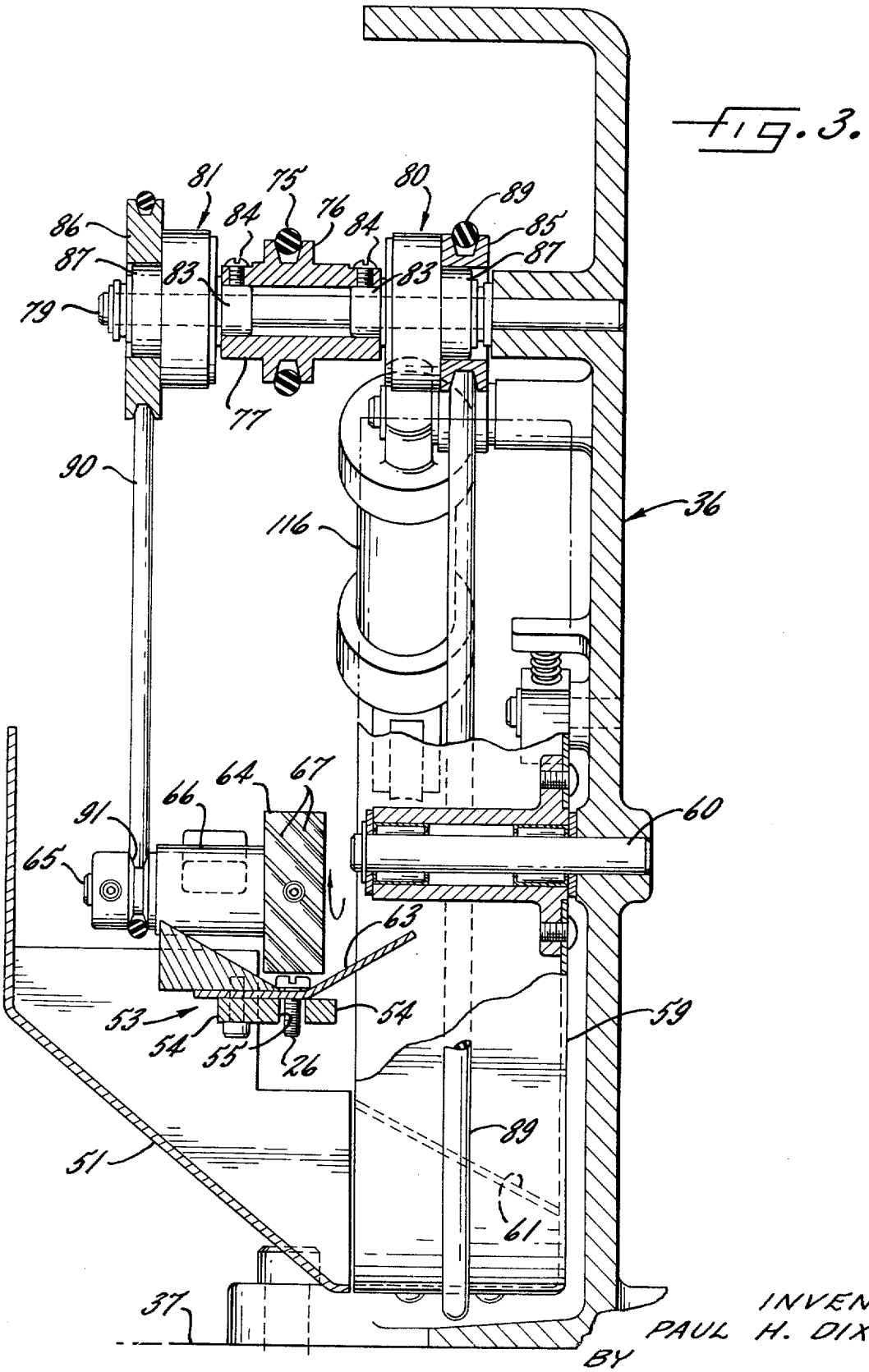
Figure 6:
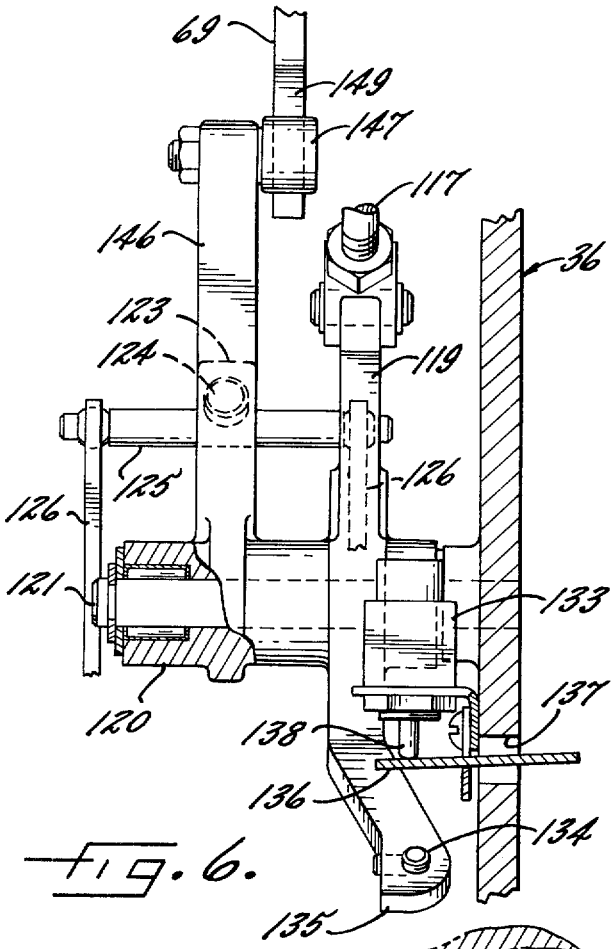
FIGS. 6 and 7 are enlarged fragmentary cross-sections taken substantially along the lines 6—6 and 7—7, respectively, of FIG. 1.

The screwdriver 30 is supported on a carriage 33 (FIGS. 1 and 2) and is reciprocated upwardly and downwardly as the carriage is slid vertically in opposite directions along an upright guide rod 34 by a double-acting pneumatic actuator 35, both the guide rod and the actuator being mounted on the outer portion of a generally upright, open-sided casting or support member 36 (FIGS. 1 and 3) anchored to a base 37 and forming the main support for the various elements of the machine 25. Pressurization of the upper end of the actuator 35 from an air supply 39 (FIG. 17) to shift the screwdriver downwardly is effected when a spring-loaded main valve 40 is shifted by depressing a manually operable control button 41 and, when the button is released, the lower end of the actuator is pressurized to retract the screwdriver upwardly. Adjustable restrictions 43 associated with check valves 44 in the pneumatic control circuit of the actuator govern the escape of air out of the actuator in such a manner that the idle upstroke of the screwdriver occurs at a considerably faster rate than the downstroke so as to reduce the overall cycle time. The machine operates quite rapidly and is capable of driving short screws 26 of the type illustrated in a one or two second cycle.

Figure 14:
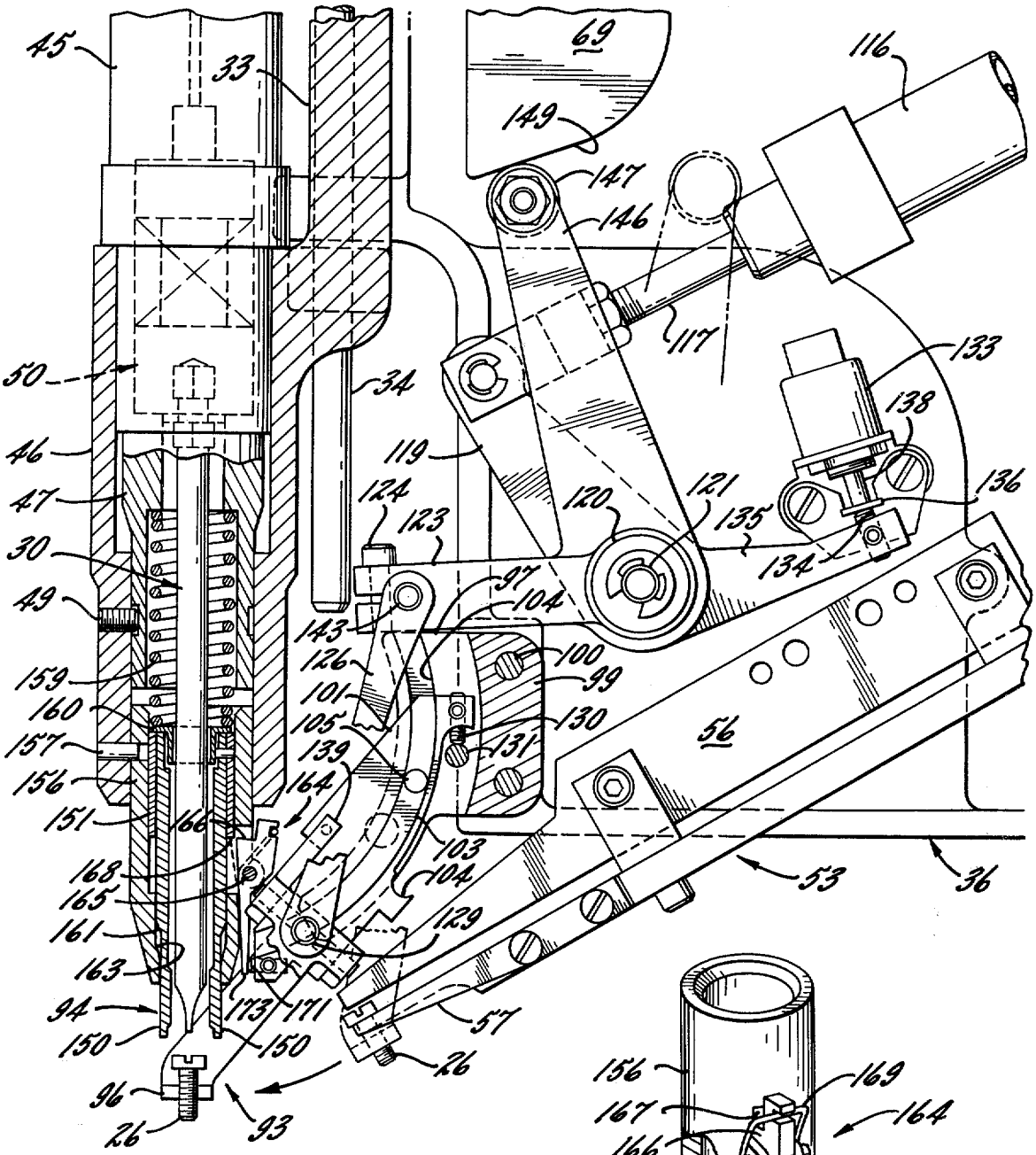
Figure 16:
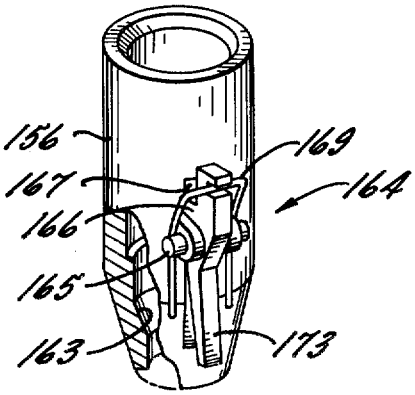
FIG. 16 is a perspective view of a mounting sleeve which telescopically receives the chuck.

To rotate the screwdriver 30, a rotary air motor 45 is supported on the carriage 33 and is operably connected to the upper end of the screwdriver. As shown in FIGS. 1 and 14, the air motor is located adjacent the upper end of an upright sleeve 46 formed on the outer end of the carriage and is threaded onto the upper end of a tubular adaptor 47 fitted within the sleeve and held against rotation therein by means of a radially extending set screw 49. A coupling disposed within and forming part of the adaptor and indicated generally in FIG. 14 by the reference numeral 50 connects the rotor of the air motor with the upper end of the screwdriver 30, the latter extending downwardly through the adaptor 47. The particular motor which has been illustrated is pressurized and begins rotating when the control button 41 is first depressed to admit air into the upper end of the actuator 45 to shift the screwdriver downwardly. Thus, the screwdriver rotates as it moves downwardly to first engage the screw 26 and then drive the screw into the workpiece 27. When the screw becomes tightened, the operator of the machine 25 releases the button 41 to stop the rotary motor and, at the same time, to pressurize the lower end of the reciprocating actuator 35 and effect retraction of the screwdriver. By employing a different adaptor, the motor 45 may be replaced with a so-called " push-to-start" air motor of the type which begins rotating only after the screwdriver encounters downward resistance resulting from the screw engaging the workpiece. Also, air motors of different types and made by various manufacturers may be employed with the machine simply by replacing the adapter 47 with one constructed for use with the particular motor selected.

Initially stored in a hopper 51 (FIGS. 1 and 3) at the inner end of the support 26 are first delivered from the hopper to an elongated track 53 and then proceed one-by-one down the track for transfer to the screwdriver 30. The track is inclined downwardly from the hopper toward the screwdriver and is formed by a pair of bars 54 (FIGS. 4 and 10) held rigidly spaced apart on the support 36 so as to define a straight slot 55 adapted to be filled with a row of screws located with their heads up and hanging from the bars, the screws being fed down the slot by gravity and being prevented from jumping out of the slot by a hold-down bar 56 overlying the slot. The lower end of the slot is closed by a pair of spring fingers 57 which hold the lowermost screw in the slot and which snap apart when outward pressure is applied to the lowermost screw threby to permit removal of that screw from the track and to enable the entire row to slide one step down the track.

To deliver the screws 26 from the hopper 51 to the track 53, a power rotated feeding wheel in the form of an open-sided drum 59 (FIG. 1) is journaled to turn within the hopper by a shaft 60 connected to the support 36 and carries on its inner periphery a series of angularly spaced scoops 61. As the drum 59 is rotated counterclockwise (FIG. 1), the scoops move downwardly through the hopper and pick up batches of screws which spill from the scoops and onto the track as the scoops move along the upper arc of their circular path. Many of the screws spilled from the scoops are guided into properly oriented positions in the slot 55 by a trough 63 (FIG. 3) located at the upper end of the track. Those screws which are dropped crosswise across the track or which are otherwise improperly oriented to proceed down the slot 55 are kicked off of the track and back into the hopper by a power rotated clearing wheel 64 located just above the track near the upper end thereof, the clearing wheel being fast on a shaft 65 which is journaled in an arm 66 supported by the hold-down bar 56.

Figure 4:
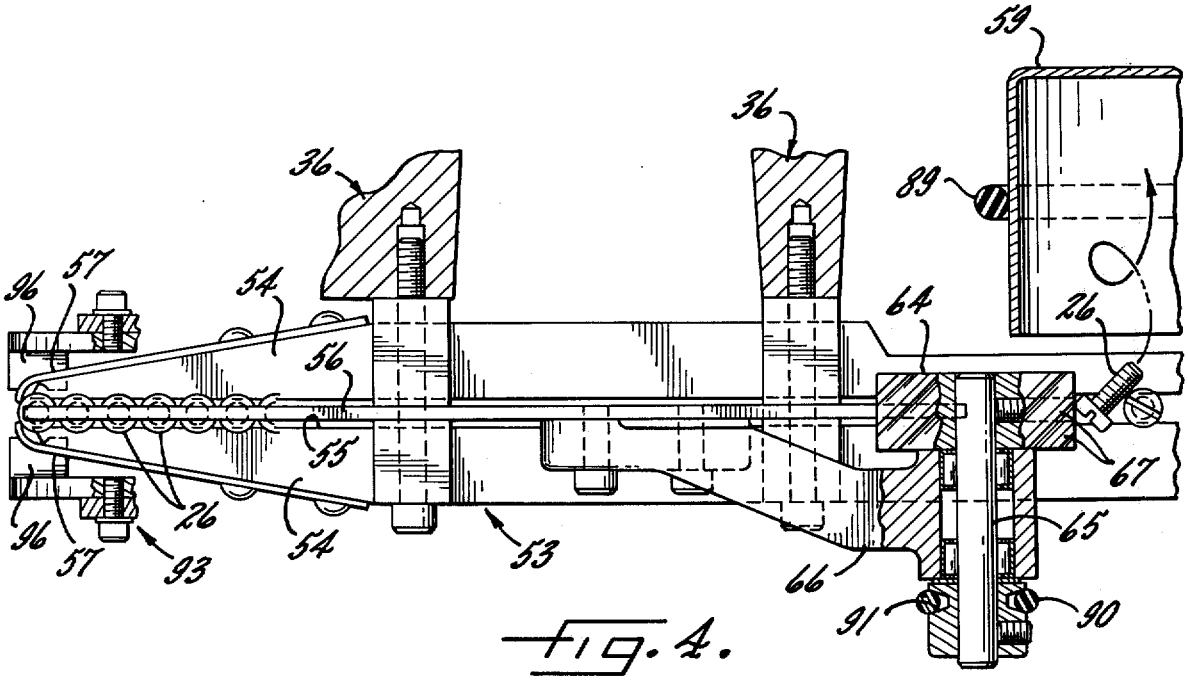
Figure 5:
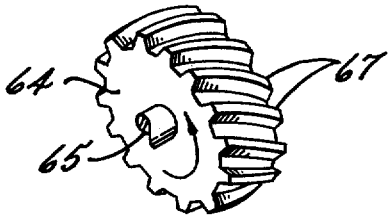
FIG. 5 is a perspective view of the clearing wheel.

The clearing wheel 64 is rotated in a counterclockwise direction (FIG. 1) and is uniquely constructed to kick the misoriented screws 26 off of the track 53 in a positive manner and to throw the screws laterally toward the support 36 and against the closed side of the feeding drum 59. For this purpose, angularly spaced ribs 67 (FIG. 5) are formed around the outer periphery of the wheel and are shaped similar to the teeth of a spiral gear, the ribs being spiraled at a predetermined helix angle and being inclined across the axis of the wheel such that the leading sides of the ribs face generally toward the support 36 and the feeding drum 59. Thus, the spiraled ribs pick up any misoriented screws on the track and, as shown in FIG. 4, throw the screws laterally against the closed side of the feeding drum from where the screws may fall back into the hopper 51. Because the screws are thrown laterally against the closed side of the feeding drum and toward the corresponding side of the hopper, there is no need to provide protective shrouding completely around the opposite side and the rear of the hopper and thus free access to the hopper and drum is possible.

According to one aspect of the invention, a novel, simplified and comparatively trouble-free drive arrangement is provided for rotating the feeding drum 59 and the clearing wheel 64 in timed relation with reciprocation of the screwdriver 30 and, in the case of the embodiment shown in FIGS. 1 to 17, for rotating the drum and the wheel directly in response to reciprocation of the screwdriver. Moreover, advantage is taken of the differential rates of the upstroke and the downstroke of the screwdriver to effect relatively slow rotation of the feeding drum on the comparatively slow downstroke and to effect rapid rotation of the clearing wheel on the faster upstroke.

In the present instance, the above-described drive arrangement includes a plate 69 (FIGS. 1 and 2) mounted to reciprocate upwardly and downwardly with the carriage 33 and formed along its inner edge with a toothed rack 70 which meshes with a pinion 71. The latter is journaled on a stub axle 73 projecting laterally from the support 36 and is keyed to a pulley 74 which also is journaled on the stub axle. An endless belt 75 is trained around the tensioned between the pulley 74 and an additional pulley 76 (FIG. 3) formed integrally with a rotatable member in the form of a sleeve 77 which is coaxial with a second stub axle 79 anchored rigidly to and projecting laterally from the support 36. Accordingly, the sleeve 77 is turned counterclockwise (FIG. 1) at a predetermined rate by the belt 75 when the rack 70 is shifted downwardly on the downstroke of the screwdriver 30 and is turned clockwise at a more rapid rate when the rack is shifted upwardly during retraction of the screwdriver.

The slow counterclockwise rotation of the sleeve 77 is utilized to turn the feeding drum 59 while the faster clockwise rotation of the sleeve is utilized to turn the clearing wheel 64. To these ends, two identical but oppositely positioned one-way clutches 80 and 81 (FIG. 3) of conventional construction are supported on the stub axle 79 at opposite ends of the sleeve with the input elements 83 of the clutches being coaxial with and projecting into the sleeve and being coupled for rotation with the sleeve by means of set screws 84. Pulleys 85 and 86 are mounted to turn with the output elements 87 of the clutches 80 and 81, respectively, the latter serving to cause rotation of the pulley 85 and idling of the pulley 86 when the sleeve 77 is rotated counterclockwise (FIG. 1) and then to cause rotation of the pulley 86 and idling of the pulley 85 when the sleeve is rotated clockwise. A drive in the form of a flexible endless belt 89 (FIGS. 1 and 3) is trained around the pulley 85 and the feeding drum 59 to rotate the latter counterclockwise when the pulley 85 is rotated. Counterclockwise rotation of the clearing wheel 64 in response to clockwise rotation of the pulley 86 is effected by a crossed endless belt 90 stretched between the pulley 86 and a pulley 91 fast of the shaft 65 which supports the clearing wheel.

From the foregoing, it will be apparent that downward movement of the carriage 33 to shift the screwdriver 30 downwardly results in the sleeve 77 and the pulley 85 being turned counterclockwise (FIG. 1) to effect turning of the feeding drum 59 in a corresponding direction and at a comparativeey slow rate to advance a batch of screws 26 toward a position above the track 53. During turning of the feeding drum, the clearing wheel 64 remains stationary and does not interfere with the delivery of the screws onto the track because the one-way clutch 81 enables the sleeve 77 to freewheel with respect to the pulley 86. When the carriage is shifted upwardly to rapidly retract the screwdriver, the sleeve 77 and the pulley 86 are turned clockwise and, through the crossed belt 90, effect counterclockwise turning of the clearing wheel 64 at a very fast rate. The clearing wheel thus sweeps off of the track 53 any misoriented screws previously delivered onto the track during rotation of the feeding drum. As the clearing wheel rotates, the feeding drum simply idles because of the one-way clutch 80. Accordingly, the drum 59 and the wheel 64 are rotated at the proper times, at optimum rates, and in the correct direction by virtue of the relatively simple drive arrangement provided by the rack 70 and pinion 71 along with the clutches 80 and 81 and the belts 89 and 90.

Each screw 26 at the lower end of the track 53 is picked up and removed from the latter by a transfer mechanism 93 and is shifted outwardly to a delivery station or position (see FIG. 14) beneath the screwdriver 30 while the screwdriver is in its upwardly retracted position. When the screw reaches the delivery position, it is gripped by a chuck 94 located adjacent the lower end of the screwdriver and, after the screw has been gripped, the transfer mechanism is shifted reversely or inwardly to a loading station or position (FIGS. 1, 10 and 12) to pick up another screw from the track 53.

In accordance with another aspect of the invention, the transfer mechanism 93 is constructed in a novel manner so as to be capable of moving outwardly from its loading position to its delivery position only after first being conditioned to pick up a screw 26 from the track 53. Moreover, inward movement of the transfer mechanism back to the loading position is prevented until the transfer mechanism actually releases the screw to the chuck 94. In this way, the timing of the movements of the transfer mechanism is simplified as will become more apparent subsequently and, in addition, there is no danger of the delivered screw being returned inwardly with the transfer mechanism and being yanked out of the chuck.

Figure 7:
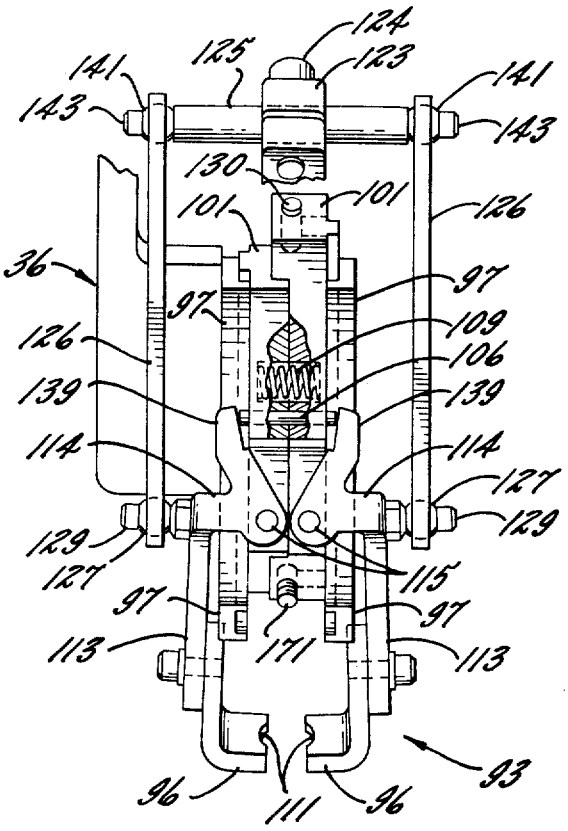
Figure 8:
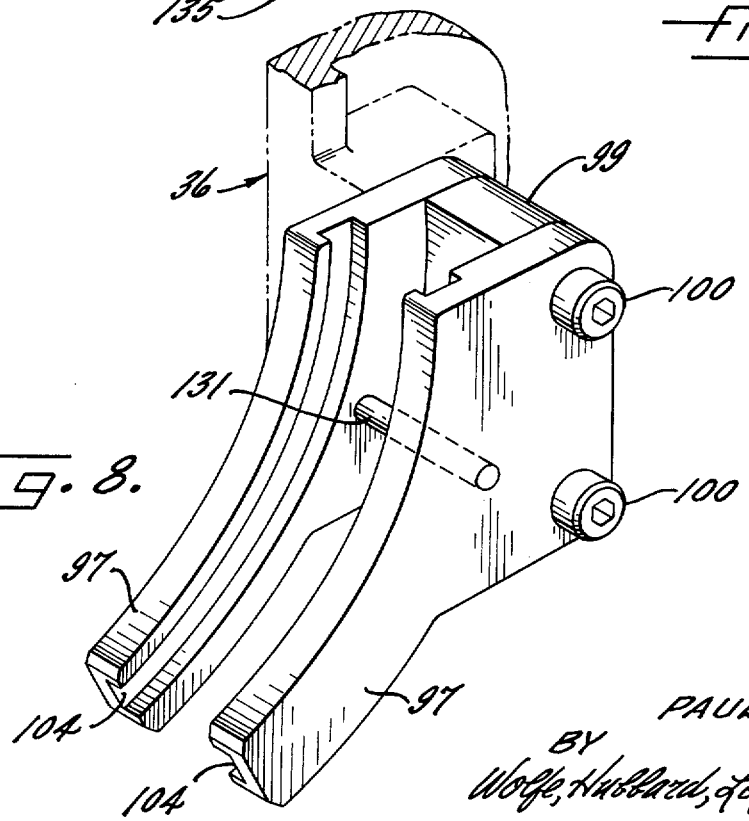
FIGS. 8 to 11 are perspective views illustrating various parts of the transfer mechanism and of the support therefor.
Figure 9:
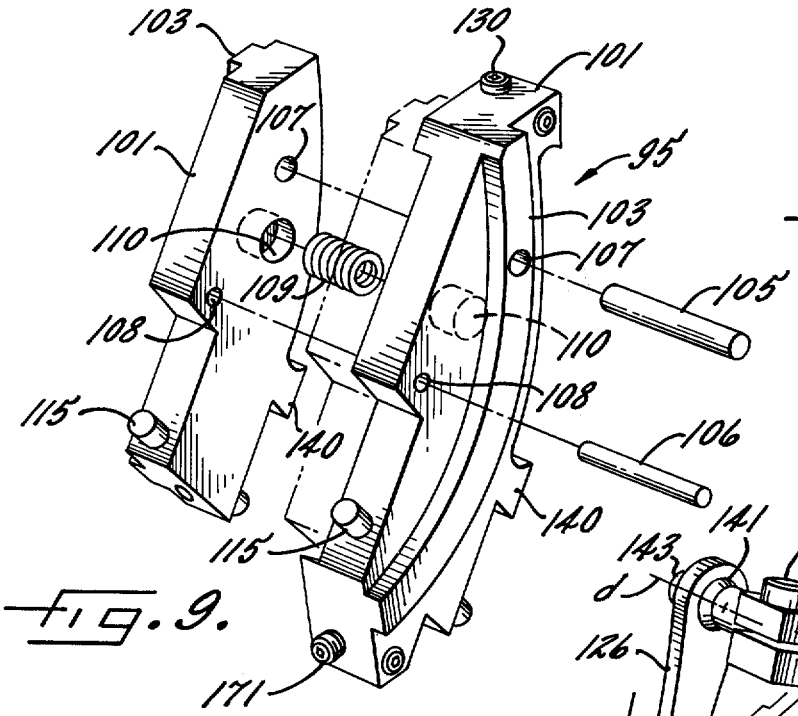
Figure 11A:
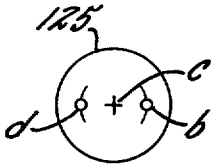
FIG. 11a is a diagrammatic view illustrating part of the transfer mechanism.
Figure 11:
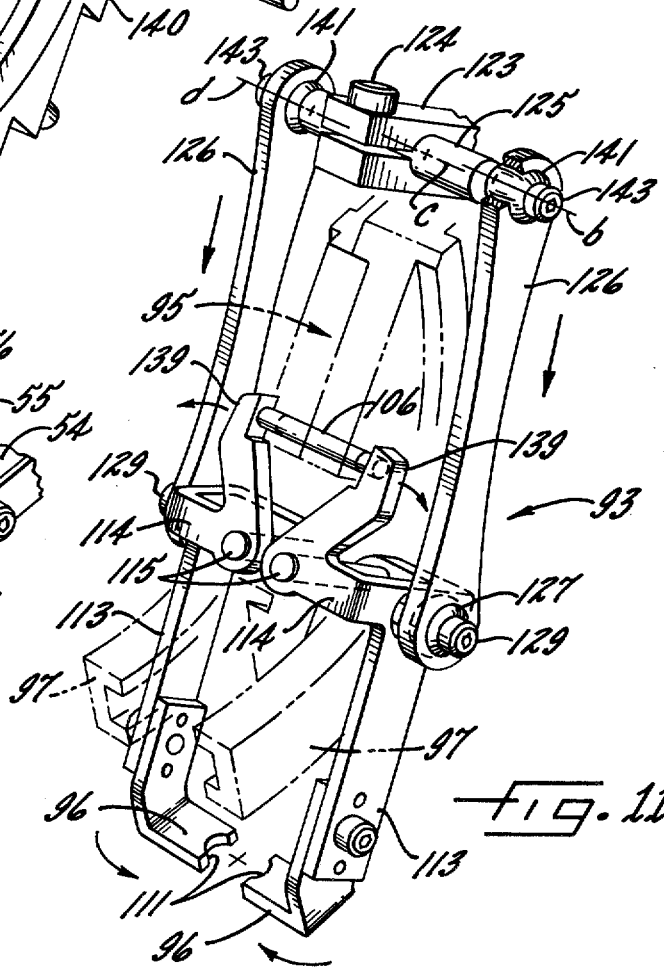
Figure 12:
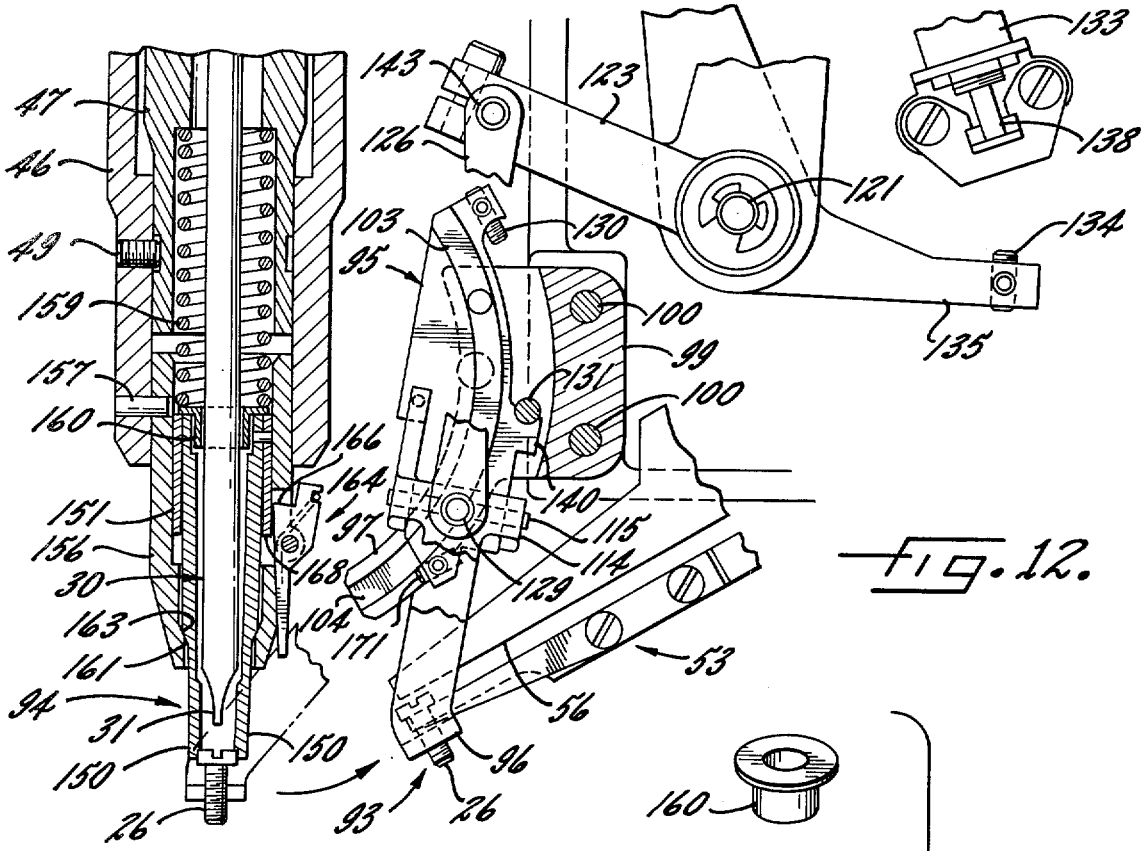
FIGS. 12, 13 and 14 are enlarged fragmentary side elevational views of part of the machine and illustrating the successive steps of an operating cycle.

More particularly, the transfer mechanism 93 comprises a slide 95 (FIG. 11) carrying a pair of jaws 96 for gripping the screws 26 and guided on the support 36 for in and out movement along a generally arcuate path to move the jaws between the loading and delivery positions shown in full and phantom in FIG. 12. As shown in FIGS. 7, 8 and 11, the slide 95 is fitted between and guided by a pair of plates 97 held in spaced apart relation by a center block 99 and fastened to the outer lower portion of the support 36 by screws 100 which also hole the plates and the block assembled to one another. The slide 95 comprises a pair of side-by-side blocks 101 (FIGS. 7 and 9) disposed between the plates 97 and each formed on its outboard side with an arcuate rib 103 (FIG. 9) which is fitted slidably into and guided by a correspondingly shaped groove 104 (FIG. 8) cut in the inner side of the adjacent plate. The two slide blocks are held against relative edgewise shifting by a pair of pins 105 and 106 (FIG. 9) which extend slidably through sets of holes 107 and 108 formed in the slide blocks, the sliding fit of the pins permitting the blocks to move broadwise away from one another. A coiled compression spring 109 is telescoped into recesses 110 formed in the inner sides of blocks and urges the blocks away from one another and into light pressing engagement with the guide plates 97.

Figure 10:
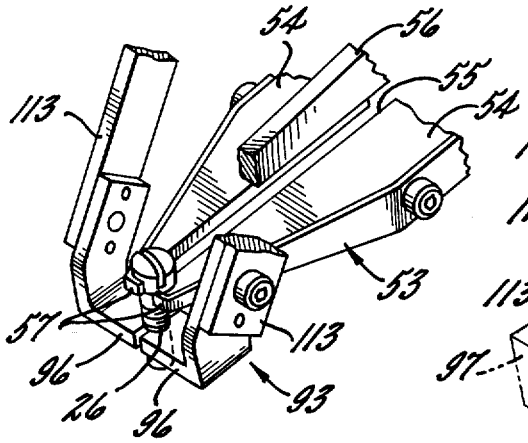

The jaws 96 are located near the outer lower ends of the slide blocks 101 and are formed with opposed recesses 111 (FIG. 11) within which the shanks of the screws 26 are received as shown in FIG. 10. Each jaw is carried on the lower end of a generally upright leg 113 (FIG. 11) whose upper end is integral with a U-shaped yoke 114. Connector pins 115 extending through the slide blocks 101 are attached pivotally to the yokes 114 to mount the jaws 96 for swinging between closed and open positions shown in FIGS. 10 and 11, respectively, about axes extending transversely of the direction of sliding of the blocks.

At the beginning of each operating cycle, the slide blocks 101 are disposed in upwardly retracted positions within the guide plates 97 to locate the jaws 96 in their loading positions adjacent the lower end of the track 53 (see FIG. 12). After the jaws are swung closed to pick up and grip the lowermost screw 26 in the track, the slide blocks are slid downwardly and outwardly to shift the jaws and the gripped screw to the delivery position beneath the chuck 94 as shown in FIG. 14. The jaws then are opened to release the screw and thereafter the slide blocks are shifted upwardly and inwardly to return the jaws to their loading positions.

To open and close the jaws 96 and move the latter between the loading and delivery positions, an air cylinder 116 (FIGS. 1 and 14) is mounted on the side of the support 36 and includes a reciprocable plunger 117 whose free end is connected pivotally to an arm 119 formed integrally with and projecting radially from a sleeve 120 (FIG. 6) which is journaled on a stub axle 121 projecting horizontally from the support. The free end of a bifurcated arm 123 (FIG. 14) projecting from the sleeve 120 is clamped by a screw 124 to the midpoint of a cylindrical rod 125 (FIGS. 7 and 11) which spans the upper ends of a pair of generally upright links 126. The upper ends of the links 126 are connected pivotally to the rod 125 while the lower end of each link is connected pivotally to the yoke 114 of the adjacent jaw 96 by means of a spherical bearing 127, the latter being supported on a screw 129 extending through the link and threaded into the yoke adjacent the upper end of the leg 113. The lower ends of the links 126 are offset laterally from the connector pins 115 and thus, when the links are lowered and raised, the jaws pivot inwardly and outwardly about the pins and are swung between their closed and open positions.

As mentioned above, the jaws 96 are located in their loading positions (FIG. 12) and are open at the beginning of each operating cycle and remain so positioned during driving of the screw 26. When the screw has been driven and the operator releases the push button 41 to pressurize the lower end of the actuator 35 and retract the screwdriver 30, the head end of the cylinder 116 is simultaneously pressurized to extend the plunger 117 outwardly. By way of the arm 119, the plunger 117 rocks the sleeve 120 and the arm 123 counterclockwise (FIG. 12) to force the links 126 downwardly.

Initial downward movement of the links 126 causes the jaws 96 to begin swinging toward one another about the pins 115. At this time, however, the links 126 do not exert any substantial downward force on the slide blocks 101 because the downward motion of the links is taken up in the swinging of the jaws 96 about the pins 115. Also, the coil spring 109 urging the blocks into pressing engagement with the guide plates 97 creates a frictional resistance retarding downward movement of the blocks. Accordingly, as the links 126 initially move downwardly, the slide blocks 101 remain in their upper positions within the guide plates 97 and keep the jaws 96 located in their loading positions adjacent the lower end of the track 53 while the jaws are swung closed.

As an incident to closing upon and engaging the lower screw 26 in the track 53, the jaws 96, by virtue of such engagement, are stopped from swinging further about the pins 115. Thus, continued downward movement of the links 126 is transmitted to the slide blocks 101 through the pins 115 and overcomes the friction created by the spring 109 so as to force the blocks to move downwardly within the guide plates 97 to move the jaws and the gripped screw downwardly and outwardly from the track to the delivery position beneath the chuck 94 of the screwdriver 30. Accordingly, it will be seen that downward movement of the jaws cannot occur until the jaws actually close on the screw and stop swinging about the pins 115 and thus there is little danger of the jaws being moved away from the track while still open.

Downward and outward movement of the jaws 96 occurs just after the screwdriver 30 and the chuck 94 have been retracted upwardly out of the path of the jaws. Movement of the jaws is stopped when a set screw 130 carried by one of the slide blocks 101 engages a fixed pin 131 (see FIG. 14) spanning the guide plates 97. At the same time the set screw engages the pin or just very shortly thereafter, a spring-loaded limit control valve 133 (FIGS. 14 and 17) mounted on the support 36 is shifted to initiate the retraction of the plunger 117 of the cylinder 116. To shift the valve 133, an adjustable set screw 134 (FIG. 14) is attached to the free end of another arm 135 carried by the sleeve 120 and projecting generally oppositely from the arm 123. When the arm 135 is rocked counterclockwise through a predetermined distance during downward movement of the slide blocks 101, the set screw 134 engages one end of a short lever 136 mounted pivotally on the support 36 and the projecting through an opening 137 therein (see FIG. 6). The lever thus engages and depresses the plunger 138 of the valve 133 to shift the latter and cause retraction of the plunger 117 of the cylinder 116.

As the plunger 117 retracts, the arm 123 is rocked clockwise to raise the links 126 upwardly. With initial upward movement of the links, the jaws 96 are pivoted on the pins 115 and are swung to open positions to release the screw 26, the latter previously having been gripped by the chuck 94 in a manner to be described subsequently. Because the jaws pivot on the pins, the initial upward movement of the links 126 is ineffective to produce upward movement of the slide blocks 101 and thus the jaws remain in the delivery position shown in FIG. 14 and do not shift upwardly while being opened. As the jaws reach their fully open positions, bars 139 (FIG. 11) integral with upper ends of the yokes 114 swing into engagement with the ends of the pin 106 and prevent further swinging of the jaws about the pins 115. Thus, continued upward movement of the links 126 is transmitted to the slide blocks 101 through the pins 115 so that the blocks are moved upwardly and inwardly to return the jaws to their loading positions adjacent the lower end of the track 53. Accordingly, it will be apparent that the jaws cannot shift upwardly before the screw 26 is released and thus there is no danger that the jaws will jerk the screw out of the chuck 94. Also, because inward and outward movement of the slide blocks 101 cannot occur until the jaws are opened or closed, the jaws are moved inwardly and outwardly and swung open and closed in automatic timed relation and no critical adjustments are necessary to keep the various movements correlated.

Upward movement of the jaws 96 is terminated when downwardly projecting lugs 140 (FIGS. 9 and 12) on the lower sides of the slide blocks 101 engage and stop against the pin 131 spanning the guide plates 97. Since the track 53 is fixed, the jaws always return upwardly and inwardly to the same position. Provision is made, however, to adjust the extent to which the jaws move downwardly and outwardly to their delivery positions so as to enable exact positioning of the screw 26 directly beneath the chuck 94. Thus, by adjusting the set screws 130 and 134, the downward and outward stroke of the jaws can be lengthened or shortened so that the jaws will stop precisely when the axis of the screw intersects a vertical plane containing the axis of the chuck and extending laterally of the direction of movement of the screw. Also, the jaws may be adjusted laterally relative to such plane to enable the screw 26 to be centered laterally with respect to the chuck. For this purpose, the upper end of each of the links 126 is supported on a spherical bearing 141 (FIG. 11) and is connected to the rod 125 by a screw 143 extending through the bearing and threaded into the rod. The axis b (FIG. 11a) of one of the screws 143 is offset or eccentric in one direction relative to the axis c of the rod 125 while the axis of the other screw is offset from the axis of the rod in the diametrically opposite direction. Thus, by loosening the clamping screw 124 and turning the rod 125 relative to the arm 123, one of the links 126 may be slightly lowered while the other link is raised through a corresponding distance to cause both jaws 96 to shift laterally in the same direction. In this way, the lateral position of the jaws relative to the chuck 94 may be adjusted initially to center the jaws precisely with respect to the axis of the chuck and then the clamping screw 124 may be tightened to maintain the jaws in the thusly adjusted position.

By means of adjustable restrictions 144 (FIG. 17) associated with check valves 145 in the control circuit of the cylinder 116, the excape of air out of the cylinder is controlled in such a manner that the cylinder shifts the jaws 96 outwardly at a comparatively slow rate to maintain better control of the gripped screw 26 and then returns the jaws inwardly at a faster rate to reduce the cycle time. Also, the restriction 144 controlling the escape of air from the plunger end of the cylinder is adjusted such that the cylinder normally moves the jaws outwardly toward their delivery positions at such a rate that the jaws reach their delivery positions just after the actuator 35 has retracted the screwdriver 30 and the chuck 94 upwardly out of the path of the jaws.

In another of its aspects, the invention contemplates the provision of novel mechanical means for protecting against any misadjustment in the rate of escape of air from the actuator 35 and the cylinder 116 and for insuring that, even if such misadjustment occurs, the cylinder will be positively prevented from shifting the jaws 96 downwardly and outwardly to their delivery positions until after the actuator 35 has retracted the screwdriver 30 and the chuck 94 upwardly out of the path of the jaws. Herein, these means comprise still another arm 146 (FIG. 14) formed integrally with and projecting radially from the sleeve 120 and carrying a roller follower 147 on its free end. The follower is positioned to engage and ride along a downwardly and outwardly inclined cam surface 149 formed on the lower end of the plate 69 mounted on the carriage 33.

When the screwdriver 30 is disposed in its downward, working position, the follower 147 is spaced inwardly from the plate 69 as shown in phantom in FIG. 14. Then, as the actuator 35 is pressurized to retract the screwdriver upwardly and the cylinder 116 is pressurized simultaneously to shift the jaws 96 outwardly, the follower 147 is rocked counterclockwise. If the cylinder 116 is moving the jaws outwardly too rapidly, the follower engages the plate 69 and, as a result of such engagement, prevents the jaws from being moved outwardly by the force exerted by the cylinder. Thus, as the screwdriver and the plate 69 retract upwardly, the follower 147 moves beneath and rides along the cam surface 149 and allows the jaws 96 to move gradually outwardly. The cam surface is shaped and located to coact with the follower in such a manner as to prevent the jaws from moving outwardly into the path of the screwdriver and the chuck until the latter have been retracted upwardly out of the path of the jaws and thus, even though the actuator 35 and the cylinder 116 are pressurized at the same time and even though the restrictions 43 and 144 may be out of adjustment, there is no danger of the jaws shifting outwardly and colliding with the chuck and the screwdriver. Accordingly, the follower 147 and the cam surface 149 serve as a mechanical interlock to insure positive control of the movement of the jaws in timed relation with the movement of the screwdriver.

According to another important aspect of the invention, the chuck 94 is constructed in a novel manner to telescope downwardly over and grip each screw 26 delivered by the jaws 96 before any downward movement of the screwdriver 30 and the carriage 33 takes place and before the actuator 35 is pressurized to initiate such downward movement. To these ends, the chuck is mounted to move downwardly relative to the screwdriver and to pick up the screw from the jaws when the screwdriver reaches its upwardly retracted position near the end of each cycle. With the screw held by the chuck, the jaws can then be returned inwardly to their loading positions and out of the path of the screwdriver well before the latter is started downwardly during the next cycle and thus not only is the timing of the various operations less critical but also the view of the machine operator is not obstructed by the jaws as the screwdriver moves downwardly and drives the screw.

Figure 15:
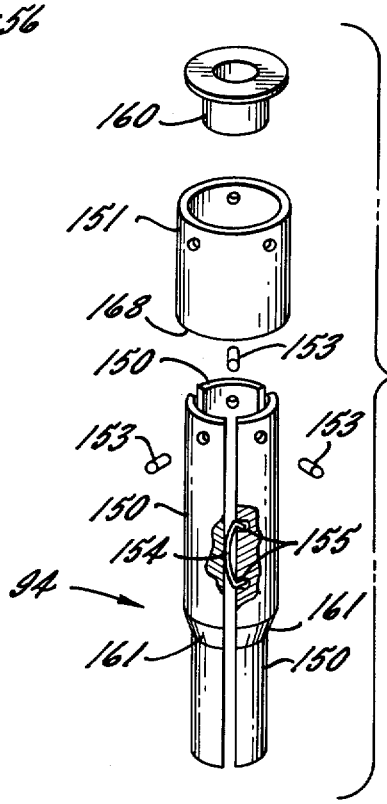
FIG. 15 is an exploded perspective view of the chuck.

More particularly, the chuck 94 is a tubular unit or sleeve formed by three upright finger sections 150 of generally arcuate cross-section and arranged in edge-to-edge relation as shown in FIG. 15. At their upper ends, the fingers 150 are telescoped into a sleeve-like collar 151 and are cantilevered hingedly to the collar by means of small pins 153 projecting through the fingers and extending radially into the collar. Located between each pair of fingers is a bowed spring 154 (one visible in FIG. 15) whose ends are fitted into recesses 155 in the edge of one finger and whose bowed portion bears against the edge of the adjacent finger. The springs urge the fingers away from one another to spread positions (FIG. 14) in which the free ends of the fingers are separated sufficiently far to telescope easily over the head of the screw 26. When pushed toward one another, the free ends of the fingers close upon and grip the screw (see FIG. 12).

As shown in FIG. 14, the collar 151 with the attached fingers 150 is telescoped slidably over the screwdriver 30 and into a slleve 156 which, in turn, is fitted into the lower end of the sleeve 46 beneath the adaptor 47, the sleeves 46 and 156 being anchored together by a pin 157. A coil spring 159 is compressed between a portion of the adaptor 47 and a bushing 160 fitted into the upper end of the collar 151 and urges the fingers 150 downwardly in the sleeve 156 to extended or lowered positions as shown in FIG. 12. Prior to picking up the screw 26 from the jaws 96, however, the fingers 150 are held in upwardly retracted raised positions in the sleeve 156 (see FIG. 14). When the fingers are in their raised positions in the sleeve 156, the bowed springs 154 force the fingers apart to enable the fingers to subsequently telescope downwardly over the screw. As the fingers are shifted to their advanced lowered positions by the coil spring 159 and telescope over the screw, downwardly tapered frusto-conical cam surfaces 161 (FIG. 15) formed intermediate the ends of the fingers slide downwardly across a similarly tapered cam surface 163 formed within the lower end of the sleeve 156. As a result of the cam surfaces 161 sliding across the cam surface 163, the fingers are forced together against the bias exerted by the bowed springs 154 and close upon and grip the screw held by the jaws 96.

To hold the fingers 150 in their raised positions (FIG. 14) in the sleeve 156 against the bias exerted by the coil spring 159, a latch 164 (FIG. 16) is carried on the outer side of the sleeve. In this instance, the latch is pivoted on a pin 165 fastened to the outer side of the sleeve 156 and includes an upwardly facing shoulder 166 (FIG. 13) projecting through an opening 167 in the sleeve and adapted to engage the lower edge 168 of the collar 151 when the latch is in its latched position shown in FIG. 13 and in phantom in FIG. 14. The latch is urged counterclockwise toward its latched position by a U-shaped spring 169 engaging the upper end portion of the latch and bearing against the pin 165 and the outer side of the sleeve 156.

To explain the operation of the chuck 94 and to summarize the operation of the overall machine 25, let it be assumed that the screwdriver 30 initially is disposed in its upwardly retracted position (as is the case at the beginning of each cycle) and that the fingers 150 are holding a screw 26 beneath the screwdriver (see FIG. 12). At this time, the jaws 96 are at rest in their loading positions adjacent the track 53 as shown in full in FIG. 12, and the latch 164 for the chuck 94 is released with the shoulder 166 thereof disposed above the lower edge 168 of the collar 151 and in engagement with the side of the collar. Thus, the coil spring 159 forces the fingers 150 to their lowered or advanced positions relative to the sleeve 156 and keeps the screw 26 positioned just a short distance below the tip 31 of the srewdriver 30. The coil spring also forces the cam surfaces 161 on the fingers into engagement with the cam surface 163 on the sleeve 156 to keep the fingers closed in gripping engagement with the screw.

When the operator depresses the control button 41, the rotary air motor 45 is energized and the upper end of the actuator 35 is pressurized thereby to shift the screwdriver 30, the adaptor 47, and the sleeves 46 and 156 downwardly in unison. At this time, the coil spring 159 acts as a rigid link between the adaptor 47 and the chuck 94 and forces the chuck and the gripped screw 26 to move downwardly in unison with the screwdriver. During the downward movement of the screwdriver, the feeding drum 59 is turned slowly to advance the scoops 61 counterclockwise and to spill a batch of screws onto the track 53.

Figure 13:
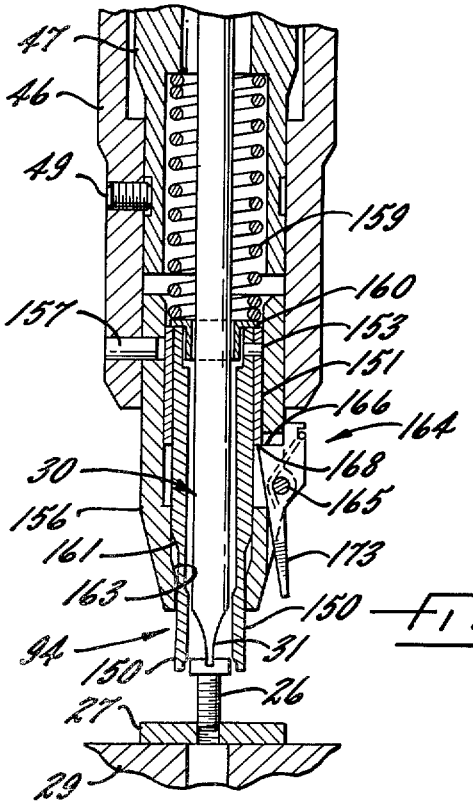

As the downwardly advancing screw 26 initially engages the workpiece 27, further downward movement of the chuck 94 is stopped. The coil spring 159 compresses, however, and allows the screwdriver 30 and the sleeve 156 to continue to move downwardly relative to the chuck. The rotating screwdriver thus moves downwardly into engagement with the head of the screw and begins threading the screw into the workpiece (see FIG. 13). At the same time, the cam surface 163 on the sleeve 156 moves downwardly away from the cam surfaces 161 on the fingers 150 to enable the bowed springs 154 to spread the fingers apart sufficiently far to release the screw. Also, as shown in FIG. 13, the shoulder 166 on the latch 164 moves downwardly alongside the collar 151 and then snaps inwardly beneath the lower edge 168 of the collar as a result of the collar being stopped while the sleeve 156 and the latch 164 carried thereon continue to move downwardly. Thus, as the screw is driven into the workpiece, the fingers 150 are held in their upper retracted positions within the sleeve 156 by the latch 164 and are spread apart as a result of the cam surfaces 161 being held upwardly away from the cam surface 163.

After the screw 26 has been driven, the operator releases the control button 41 to pressurize the lower end of the actuator 35 and thereby cause the screwdriver 30, the chuck 94 and the sleeves 46 and 156 to move upwardly in unison at rapid rate, the fingers 150 of the chuck being held in their upper positions as they move upwardly. During such upward movement, the clearing wheel 64 is rotated rapidly to sweep any improperly oriented screws 26 off of the track 53. In addition, when the actuator 35 is pressurized, the cylinder 116 also is pressurized and causes the jaws 96 to pick up a screw from the track and to begin moving downwardly and outwardly toward their delivery positions.

The jaws 96 approach their delivery positions just after the screwdriver 30 and the chuck 94 have been retracted upwardly out of the path of the jaws and reach the upper end of the upstroke (see FIG. 14). As the jaws reach their delivery positions, an adjustable set screw 171 (FIGS. 9 and 14) carried on the outer end of one of the slide blocks 101 engages a downwardly projecting tail 173 on the latch 164 and pivots the latch clockwise from the position shown in phantom in FIG. 14 to the position shown in full. As a result, the shoulder 166 on the latch is swung outwardly from beneath the lower edge 168 of the collar 151 to enable the collar and the attached fingers 150 to slide downwardly to their lowered positions by virtue of the force exerted by the coil spring 159. The fingers thus telescope downwardly over the head of the screw 26 held in the jaws 96 and, as the cam surfaces 161 slide downwardly over the cam surface 163, the fingers are forced together and close upon and grip the screw (see FIG. 12) At this time, the set screw 134 on the arm 135 hits the lever 137 and depresses the plunger 138 of the limit control valve 133 to cause the plunger 117 of the cylinder 116 to retract. The jaws 96 thus are first opened up to release the screw 26 held in the chuck 94 and, after the screw has been released, the jaws are retracted inwardly to their loading positions adjacent the track 53 and well out of the downward path of the screwdriver 30. Accordingly, when another cycle is initiated, the operator will have an unobstructed view as the screwdriver moves downwardly and drives the screw previously loaded into the chuck at the end of the preceding cycle. Also, with the jaws always retracted prior to the screwdriver starting downwardly, sufficient vertical space is available to enable the incorporation of a vacuum or magnetic chuck into the machine 25 if it is desirable to use a chuck other than the mechanical chuck 94.

Figure 17:
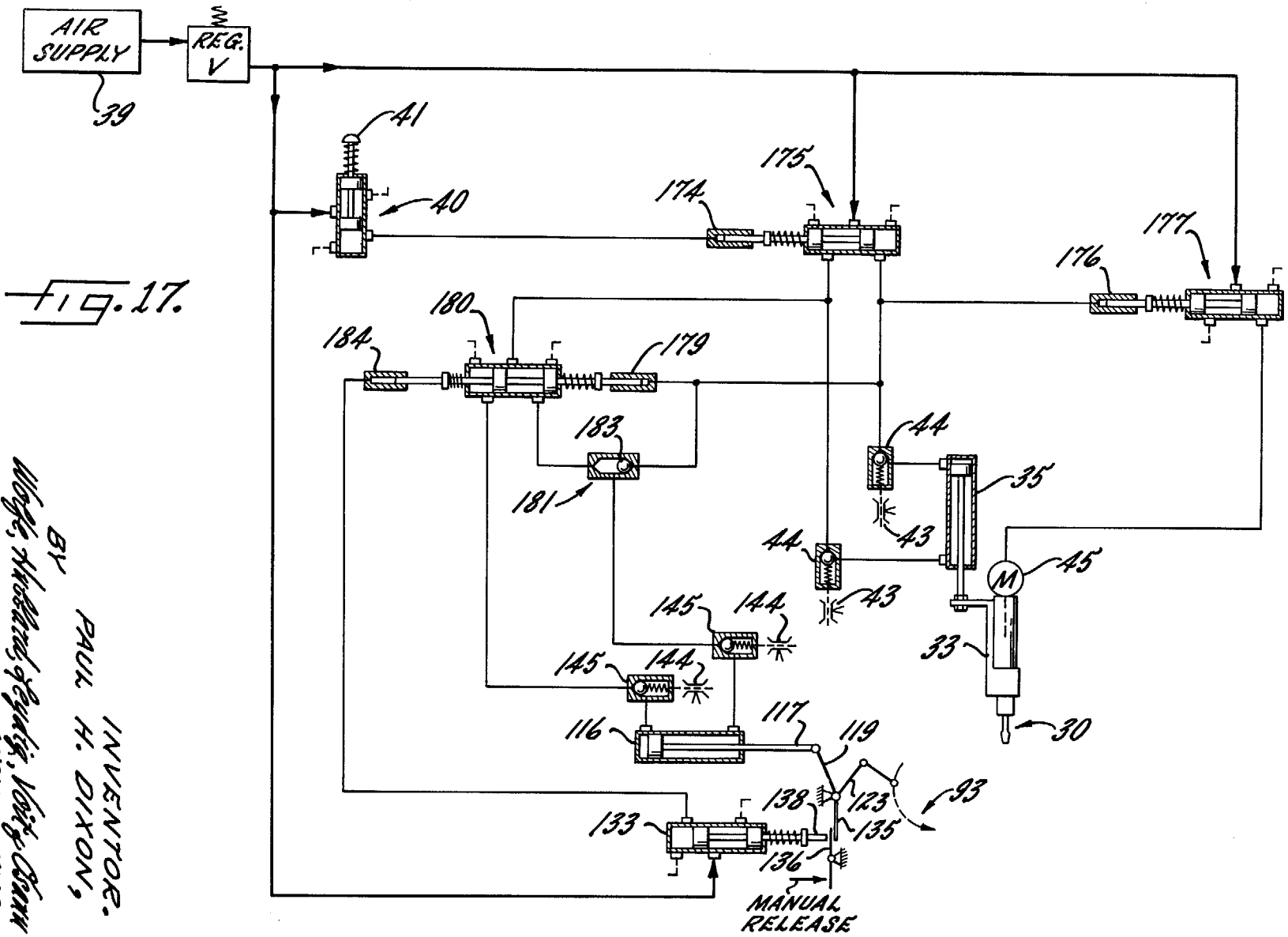
FIG. 17 is a diagram of a circuit for controlling operation of the machine.

The pneumatic circuit for controlling the foregoing operations will be described briefly and is shown in FIG. 17 at the start of a cycle. When the button 41 is depressed to shift the main control valve 40 from the position shown, air is admitted through the valve 40 and to the pilot actuator 174 of a spring-loaded relay valve 175 thereby to shift the valve. Air then is directed through the relay valve 175 from the air supply 39 and flows into the upper end of the actuator 35 to start the screwdriver 30 through its downstroke. At the same time, air flows through the relay valve 175 to the pilot actuator 176 of a spring-loaded valve 177 for controlling the rotary motor 45. The valve 177 thus is shifted and directs air from the supply 39 to the rotary motor to initiate rotation of the screwdriver. For purposes to be described subsequently, air passing through the valve 175 during the downstroke of the screwdriver flows into one pilot actuator 179 of a relay valve 180 to shift the latter from the position shown and also flows into a shuttle valve 181 to move the ball 183 thereof from right to left.

After the screw 26 has been driven and the operator releases the button 41 to return the main valve 40 to the position shown, the spring-loaded relay valve 175 returns to its original positions thus allowing the spring-loaded motor control valve 177 to return and cut off the flow of air to the rotary motor 45. In addition, air is admitted through the relay valve 175 from the air supply 39 and flows into the lower end of the actuator 35 to begin retracting the screwdriver 30. At the same time, air flows from the valve 175, through the previously shifted relay valve 180, and into the head end of the cylinder 116 to begin shifting the transfer mechanism 93 outwardly to its delivery position.

When the transfer mechanism reaches its delivery position, the arm 135 causes depression of the plunger 138 of the limit control valve 133 to shift the latter from the position shown. At this time, a momentary pulse of air passes from the supply 39, through the limit control valve 133 and into the other pilot actuator 184 of the relay valve 180 thereby to return the latter to its original position. Air then flows from the supply 39, through the relay valves 175 and 180 and into the shuttle valve 181 to return the ball 183 thereof from left to right and to allow air to flow from the shuttle valve into the plunger end of the cylinder 116 to retract the transfer mechanism 93 inwardly to its loading position, the arm 135 moving away from the spring-loaded plunger 138 of the limit control valve 133 to allow the latter to shift back to its original position. The transfer mechanism 93 stops upon returning inwardly to its loading position and, until another cycle is begun, is held in such position by virtue of the air supply 39 communicating with the plunger end of the cylinder 116 through the relay valves 175 and 180 and the shuttle valve 181. Also, the transfer mechanism 93 is held in its loading position during the downstroke of the screwdriver 30 because, as described above, the ball 183 of the shuttle valve 181 is shifted from right to left when the relay valve 175 is shifted to admit air into the lower end of the actuator. With the ball disposed in its leftward position, air passes from the supply 39, through the relay valve 175 and the shuttle valve 181, and into the plunger end of the cylinder 116 to hold the transfer mechanism 93 retracted as the screwdriver 30 moves downwardly.

If for some reason the screw 26 picked up in the jaws 96 of transfer mechanism 93 should happen to jam and prevent the transfer mechanism from moving fully outwardly to its delivery position and actuating the limit control valve 133, the machine operator may manually pivot the lever 136, by engaging the end of the lever projecting through the opening 137 in the support 36, thereby to depress the plunger 138 and effect opening of the jaws 96, release of the jammed screw and subsequent retraction of the transfer mechanism. The machine 25 then may be run through an idle cycle to load another screw into the chuck 94.

It will be apparent from the foregoing that the present invention brings to the art a new and improved automatic assembly machine 25 whose various operating mechanisms are comparatively simple in construction. While the operating mechanisms coact with one another and cause the different operations to occur in proper sequence, each mechanism, for the most part, can be adjusted independently of every other mechanism and without affecting the timing of such other mechanism. For example, let it be assumed that the machine is to be used to drive screws which are somewhat longer than those illustrated. In such an instance, the screwdriver 30 reciprocates through a longer stroke and stops at the bottom of its downstroke at a position somewhat lower than that shown in phantom in FIG. 1 when shorter screws are being driven, the screwdriver, however, always starting from and returning to the same upper retracted position shown in full in FIG. 1 regardless of the length of the screws. Even though the length of the stroke is changed, only the operation of the feeding drum 59 and the clearing wheel 64 is affected directly. That is, the drum and the wheel will rotate through greater angular distances as a result of the increased stroke but, in most cases, the added rotation imparted to the durm and the wheel is insignificant. Because the jaws 96 of the transfer mechanism 93 are shifted by the cylinder 116 and not by the same actuator 35 used for reciprocating the screwdriver, neither the length of the inward and outward stroke of the jaws nor the extent of the opening and closing movement of the jaws are effected when the length of the stroke of the screwdriver is changed. When driving longer screws, it may be desirable for smoothness of operation to adjust the rate of actuation of the cylinder 116 so as to slow the rate at which the jaws 96 are advanced outwardly during retraction of the screwdriver through its longer upstroke. This adjustment is not absolutely necessary, however, and is not critical since the follower 147 and the cam surface 149 insure that the jaws cannot collide with the screwdriver 30 and the chuck 94 even though the latter are shifted through a comparatively long upstroke.

Any adjustments necessary to the transfer mechanism 93 can be made quickly and easily. Thus, by adjusting the screws 130 and 134, the length of the inward and outward stroke of the jaws 96 can be adjusted thereby to enable changing of the outer limit of the outer stroke so that the jaws can be centered precisely beneath the chuck 94. If the stroke of the jaws is changed, the set screw 171 can be adjusted inwardly or outwardly as necessary to insure that the latch 164 will be tripped at the proper time as the jaws approach the end of their outward stroke. Accordingly, it is a comparatively simple matter to make adjustments to the transfer mechanism and such adjustments do not affect the timing or the length of stroke of the screwdriver.

DESCRIPTION OF ALTERNATE EMBODIMENTS

Figure 18:
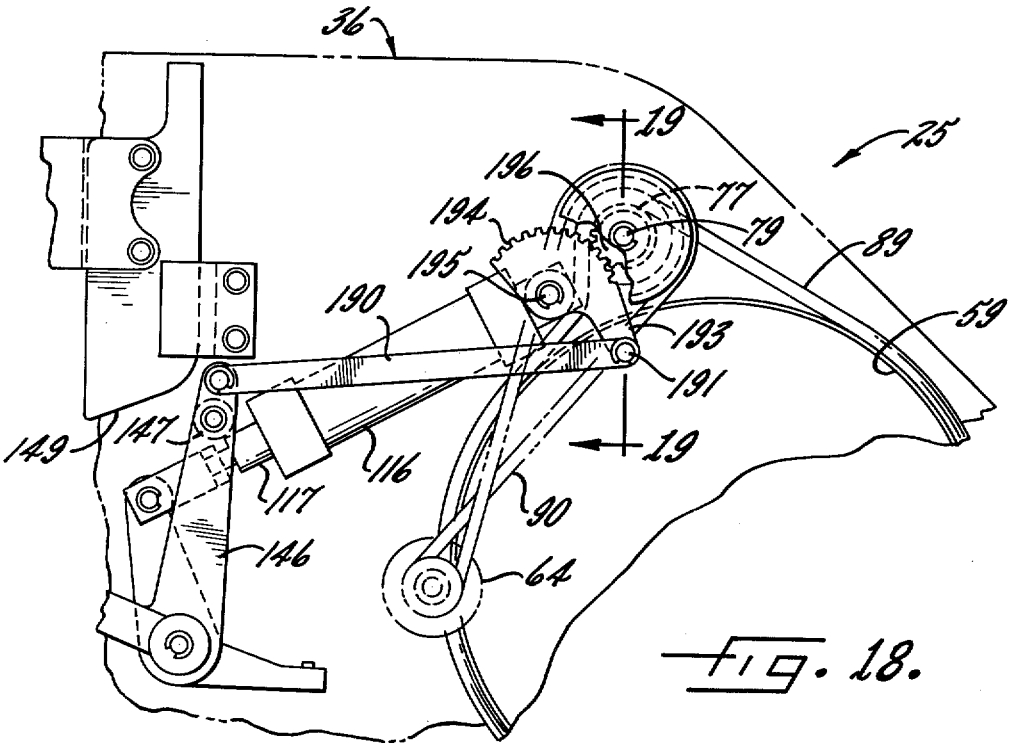
FIG. 18 is a fragmentary side elevation of a modified machine incorporating the features of the invention.
Figure 19:
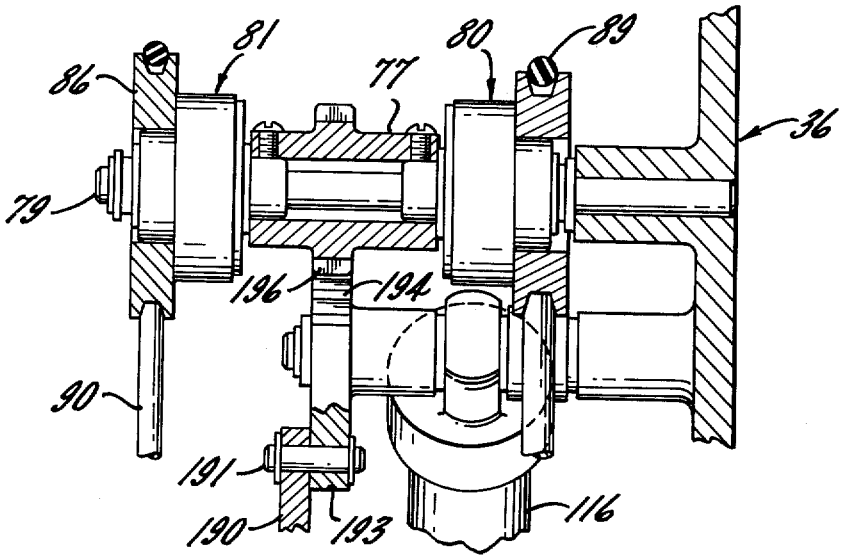
FIG. 19 is an enlarged fragmentary cross-section taken substantially along the line 19—19 of FIG. 18.
Figure 23:
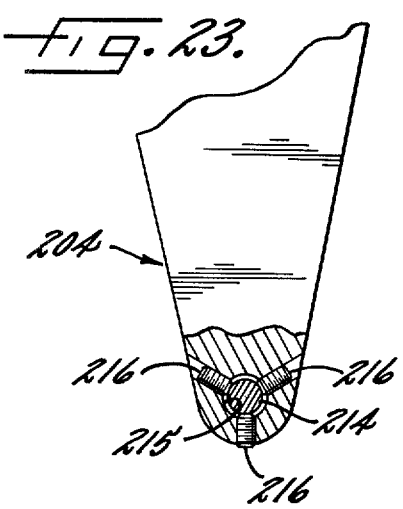
FIG. 23 is a fragmentary plan view of part of the finder.

A modified machine 25 is shown in FIGS. 18 and 19 in which parts corresponding to those of the first embodiment are indicated by the same reference numerals. In this instance the feeding drum 59 and the clearing wheel 64 are driven in a unique manner which insures that the drum and the wheel will be rotated through precisely the same angular distance during each operating cycle regardless of the length of the stroke of the screwdriver 30. This is achieved by actuating the drum and the wheel in response to operation of the cylinder 116 instead of in response to reciprocation of the screwdriver.

As shown in FIG. 18, a link 190 is pivotally connected at one end to the upper end of the arm 146 and thus is rocked inwardly and outwardly when the arm is rocked by the cylinder 116 as an incident to shifting the transfer mechanism 93 inwardly and outwardly. The other end of the link 190 is connected pivotally at 191 to an ear 193 formed integrally with and projecting radially from a gear segment 194 which is mounted to pivot on the support 36 at 195. The teeth of the gear segment 194 mesh with a gear 196 formed integrally with and encircling the sleeve 77 intermediate the ends thereof.

Accordingly, when the arm 146 is rocked counterclockwise as the transfer mechanism 93 is shifted outwardly, the link 190 is pulled outwardly and turns the gear segment 194 clockwise thereby resulting in counterclockwise turning of the gear 196 and the belt 89, the sleeve 77 turns the feeding drum 59 counterclockwise and at a relatively slow rate since the outward stroke of the transfer mechanism 93 is comparatively slow. When the transfer mechanism is retracted inwardly at a more rapid rate, the arm 146 is rocked clockwise to push the link 190 inwardly and effect clockwise turning of the sleeve 77. Thus, the clearing wheel 64 is turned counterclockwise by way of the clutch 81 and the crossed belt 90 and is turned rapidly as a result of the arm 146 being moved at a fast rate as the transfer mechanism is retracted.

From the foregoing, it will be seen that the angular distances through which the feeding drum 59 and the clearing wheel 64 are rotated remain constant regardless of the length of the stroke of the screwdriver 30 and since, the length of the stroke of the transfer mechanism 93 is adjusted only infrequently and then by only nominal amounts, the drum and the wheel are, for all practical purposes, rotated through a constant distance during every operating cycle. Thus, even though the stroke of the screwdriver may be changed, the feeding drum may be rotated through an optimum and constant distance at all times so as to drop an adequate number of screws 26 onto the track 53 and yet without rotating through an excessive distance and unduly agitating and perhaps damaging the screws.

Still another machine is shown in FIGS. 20 to 23 and, in this instance, the support 36 is mounted pivotally on the base 37 for horizontal movement about two horizontally spaced upright axes so that the screwdriver 30 can be swung to a plurality of positions over the workpiece 27 in order to drive screws 26 in a series of horizontally spaced holes 27a formed in the workpiece. To mount the support 36 pivotally on the base 37, a post 200 (FIG. 20) upstands from the base and swingably supports a horizontally extending arm 201. The latter, in turn, is connected pivotally to the support 36 by a pair of vertically spaced and vertically extending pivot pins 203. Accordingly, the screwdriver 30 and the support 36 may be swung universally in a horizontal sense to enable selective positioning of the screwdriver above each of the holes 27a in the workpiece 27.

Figure 20:
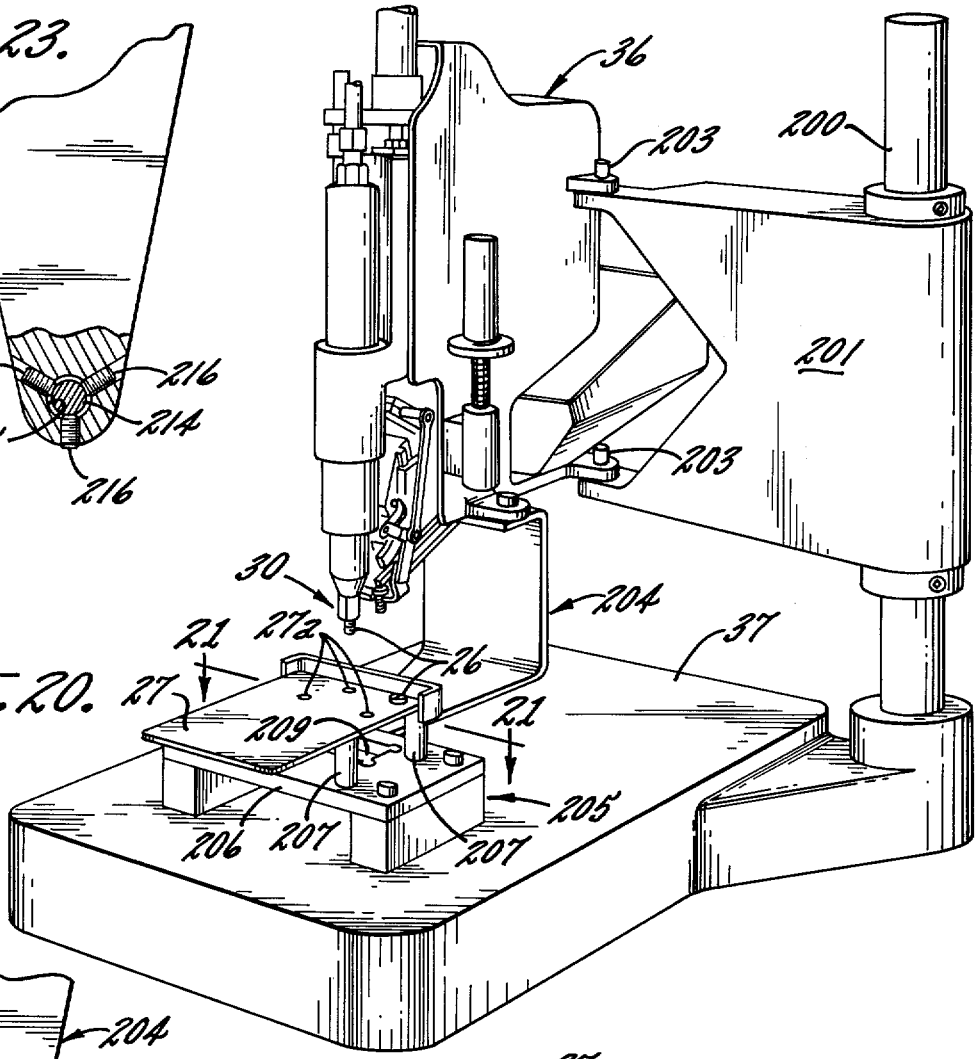
FIG. 20 is a perspective view of still another machine embodying the features of the invention, the machine being equipped with a finder for locating the driver properly relative to the workpiece.
Figure 21:
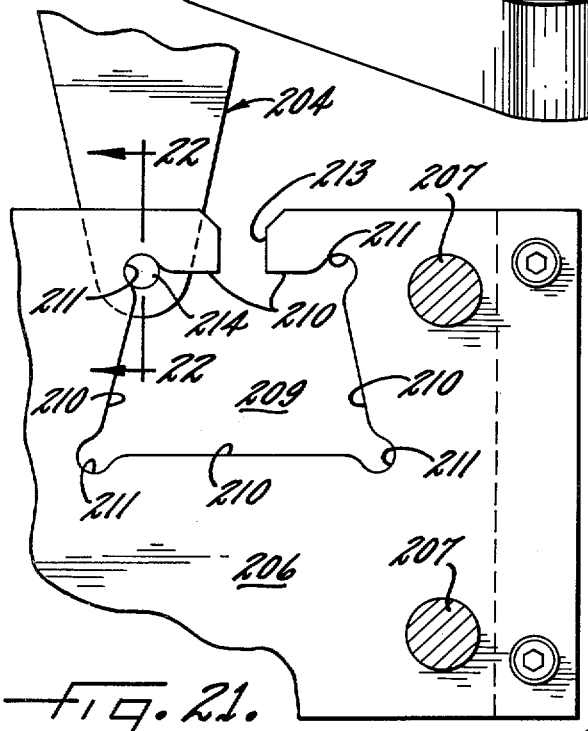
FIG. 21 is a fragmentary cross-section taken substantially along the line 21—21 of FIG. 20.
Figure 22:
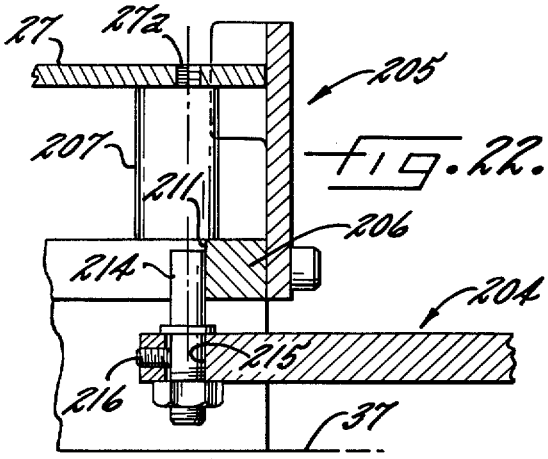
FIG. 22 is a fragmentary cross-section taken substantially along the line 22—22 of FIG. 21.

In accordance with another aspect of the invention, a simplified finger 204 coacts with a unique workpiece-holding fixture 205 to enable precise positioning of the screwdriver 30 above the holes 27a in an extremely easy and simple manner and without requiring the machine operator to move the finder except as an incident to normal movement of the screwdriver. As shown in FIGS. 20 to 22, the fixture 205 is anchored to the base 37 and includes a lower template 206 spaced upwardly from the base and supporting upright posts 207 upon which the workpiece 27 is adapted to be held during driving of the screws 26. A vertically extending opening 209 is formed through the template 206, and the upright side walls 210 of the opening are formed with open-sided recesses 211 each underlying and corresponding positionally to one of the holes 27a in the workpiece. An upright passage 213 extends through the inner side wall 210 and establishes communication between the opening 209 and the outside of the fixture.

The finder 204 is bolted rigidly to the underside of the support 36 and comprises a horizontal arm extending outwardly to a position beneath the screwdriver 30. An upwardly projecting locator pin 214 is carried on the outer end of the finder and is centered beneath the screwdriver. To enable precise centering of the pin 214 beneath the screwdriver, the pin is fitted loosely within a hole 215 (FIG. 23) in the outer end of the finder and is clamped therein by three angularly spaced and radially extending set screws 216 threaded into the finder. Thus, by adjusting the set screws, the pin 214 may be shifted radially within the hole 215 until the axis of the pin is in exact vertical alinement with the axis of the screwdriver.

When setting up the machine for use, the operator simply swings the support 36 horizontally to move the locator pin 214 horizontally through the passage 213 in the template 206 and into the opening 209 therein. Thereafter, the support is simply swung between each cycle to move the pin 214 successively into each of the recesses 211 and, as an incident to seating in each recess, the pin automatically locates and holds the screwdriver 30 above the hole 27a overlying the recess so that the screw 26 will be driven into the hole when the screwdriver is actuated. Accordingly, it will be apparent that, between each cycle, the operator need not first move the finder 204 and the locator pin 214 before swinging the screwdriver 30 to a new position. Instead, the locator pin moves within the opening 209 automatically as an incident to swinging the screwdriver above the next hole 27a and then lodges in one of the recesses 211 to locate the screwdriver. The pin need be removed from the opening 209 only when the fixture is changed or when service is to be performed on the machine.

I claim as my invention:

1. An automatic assembly machine having a support, a rotatable feeding wheel on said support for delivering randomly oriented fasteners to an elongated track mounted on the support, a rotatable clearing wheel mounted on said support above said track for sweeping improperly oriented fasteners off of said track, and a power-reciprocated tool mounted on said support and movable through up and down strokes to receive properly oriented fasteners transferred from said track and to assemble the fasteners to workpieces, the improvement in said machine comprising, a rotatable member mounted on said support and turnable back and forth in timed relation to up and down reciprocation of said tool, first and second endless belt drives connecting said rotatable member to said feeding wheel and said clearing wheel, respectively, and first and second one-way clutches associated with said first and second drives, respectively, and operable to rotate said feeding wheel when said member is turned in one direction and to rotate said clearing wheel when said member is turned in the opposite direction while leaving each wheel idle during rotation of the other wheel.

2. An automatic assembly machine as defined in claim 1 in which said clutches include input elements connected to and coaxial with opposite ends of said rotatable member, each clutch further including an output element coaxial with said rotatable member and connected to the belt of the respective drive.

3. An automatic assembly machine as defined in claim 1 in which said support is disposed on one side of said clearing wheel, the outer periphery of said clearing wheel being formed with a plurality of angularly spaced flutes for sweeping improperly oriented fasteners from said track, said flutes being inclined relative to the axis of said wheel and in a direction to sweep said improperly oriented fasteners laterally of said track and toward said support.

4. An automatic assembly machine as defined in claim 2 further including a transfer device mounted on said support for delivering fasteners from said track to said tool, mechanism for shifting said transfer device outwardly and inwardly between said track and said tool, and means operably connected between said mechanism and said rotatable member for turning the latter in one direction when said transfer device is shifted outwardly and in the opposite direction when said transfer device is shifted inwardly.

5. An automatic assembly machine as defined in claim 4 in which said mechanism moves said transfer device outwardly from said track to said tool at a comparatively slow rate and moves the transfer device inwardly from said tool to said track at a faster rate, said first clutch being connected to rotate said feeding wheel when said rotatable member is turned in one direction and at a comparatively slow rate as said transfer device is moved outwardly, and said second clutch being connected to rotate said clearing wheel when said rotatable member is turned in the opposite direction and at a faster rate as said transfer device is moved inwardly.

6. An automatic assembly machine as defined in claim 2 further including a toothed rack connected to and movable up and down with said tool, a pinion rotatably mounted on said support and meshing with said rack, and means connecting said pinion to said rotatable member to turn the latter in response to rotation of said pinion.

7. An automatic assembly machine as defined in claim 6 in which the downstroke of said tool occurs at a slower rate than the upstroke, said first clutch being connected to rotate said feeding wheel when said member is rotated in one direction and at a comparatively slow rate during the downstroke of said tool, and said second clutch being connected to rotate said clearing wheel at a faster rate when said member is rotated in the opposite direction during the upstroke of said tool.

8. An automatic assembly machine having a support, a rotatable feeding wheel on said support for delivering randomly oriented fasteners to an elongated track mounted on the support, a rotatable clearing wheel mounted on said support above said track for sweeping improperly oriented fasteners off of said track, and a power-reciprocated tool mounted on said support and movable through up and down strokes to receive properly oriented fasteners transferred from said track and to assemble the fasteners to workpieces, the improvement in said machine comprising, a rotatable member mounted on said support and turnable back and forth in timed relation to up and down reciprocation of said tool, drive means connecting said member to said wheels and including first and second endless elements for rotating the feeding wheel and the clearing wheel, respectively, and one-way clutch means associated with said drive means and operable first to turn said wheels and then to leave said wheels idle as said member rotates back and forth.

9. An automatic assembly machine comprising a support, a power rotated driver mounted on said support for reciprocation through upward and downward strokes and operable to engage and drive a fastener during said downward stroke, a transfer mechanism movable inwardly and outwardly between a loading station and a delivery station and operable first to pick up a fastener at said loading station thereafter to move outwardly to said delivery station to locate the fastener in the downward path of said driver, said transfer mechanism comprising a slide guided on said support for inward and outward movement, a pair of opposed fastener holder jaws, connectors mounting said jaws on said slide to move inwardly and outwardly with the latter between said loading and delivery stations and mounting the jaws pivotally on the slide to swing through a limited range between open and closed positions, and actuator means connected to said jaws and operable when the jaws are in each station to first swing the jaws about said connectors until the jaws stop upon reaching one of said positions, said actuator means being responsive to the force created by stopping of the jaws and thereafter acting through said connectors to move said slide on said support so as to move the jaws from one station to the other.

10. An automatic assembly machine as defined in claim 9 further including means carried on said slide and engageable with the jaws to stop swinging of the jaws when the latter reach said open positions, said jaws being stopped upon reaching said closed positions by virtue of engagement of the jaws with the fastener.

11. An aromatic assembly machine as defined in claim 9 further including a spring resiliently pressing said slide against said support to retard movement of the slide on the support during swinging of said jaws between said open and closed positions.

12. An automatic assembly machine as defined in claim 11 in which said slide comprises a pair of opposed blocks each bearing against said support, said spring being sandwiched between said blocks and urging the latter away from one another and into pressing engagement said said support.

13. An automatic assembly machine as defined in claim 9 further including a pair of links each connected at one end to one of said jaws to pivot about an axis offset from the pivot axis of the jaw, a rod spanning and connected pivotally to the other ends of said links, and said actuator means being connected to said rod and being operable to shift said links to first swing said jaws between said positions and, with continued shifting of the links, to move said jaws between said stations.

14. An automatic assembly machine comprising a support, a carriage mounted for up and down reciprocation on said support and carrying a power rotated driver for driving a fastener on the downward stroke of said carriage, a transfer mechanism mounted on said support for inward and outward movement between a loading station and a delivery station, said transfer mechanism picking up a fastener at said loading station and thereafter moving outwardly to said delivery station to locate the fastener in the downward path of said driver, a first fluid operated actuator connected between said support and said carriage for reciprocating the latter upwardly and downwardly, a second fluid operated actuator connected between said support and said transfer mechanism for moving between said support and said transfer mechanism for moving the latter inwardly and outwardly, and coacting means movable with said carriage and said transfer mechanism and engageable with one another to prevent said second actuator from moving said transfer mechanism outwardly to said delivery station until said carriage has been retracted upwardly through a predetermined distance by said first actuator.

15. An automatic assembly machine as defined in claim 14 including means for controlling the energization of said actuators and operable to energize the first actuator in a direction tending to move said transfer mechanism outwardly, said coating means engaging one another and limiting outward movement of said transfer mechanism by said second actuator during the initial period of energization thereof.

16. An automatic assembly machine as defined in claim 15 in which said coacting means comprise a downwardly and outwardly inclined cam surface on said carriage, and a follower movable with said transfer mechanism and positioned to ride outwardly along said cam surface to enable progressive outward movement of said transfer mechanism as said carriage is shifted progressively upwardly from a predetermined elevation.

17. An automatic assembly machine comprising a support, an upright sleeve mounted on said support for up and down reciprocation, and a power rotated driver disposed within said sleeve to reciprocate with the latter through upward and downward strokes and operable during said downward stroke to engage and assemble a threaded fastener to a workpiece, the improvement in said machine comprising, a tubular chuck telescoped into said sleeve and over said driver for holding the fastener beneath the driver during said downward stroke, said chuck being mounted to slide up and down relative to the sleeve and the driver between raised and lowered positions, a spring mounted within said sleeve and urging said chuck downwardly toward said lowered position, a releasable latch mounted on said sleeve and engageable with said chuck to hold the latter in said raised position against the bias of said spring, and means for delivering fasteners one at a time to a position beneath said chuck and operable as an incident to such delivery to release said latch to enable said chuck to slide to said lowered position and to telescope over the delivered fastener.

18. An automatic assembly machine as defined in claim 17 in which said means comprise a transfer device movable inwardly and outwardly between loading and delivery stations, said transfer device picking up a fastener at said loading station and delivering the fastener to a position beneath the chuck at said delivery station, and means for shifting said transfer device outwardly to said delivery station during the upward stroke of said driver and for returning the transfer device inwardly toward said loading station prior to the next downward stroke of the driver.

19. An automatic assembly machine as defined in claim 17 including an opening in one wall of said sleeve, a downwardly facing edge on said chuck and registering with said opening when said chuck is in said raised position, said latch being mounted pivotally on the outer side of said sleeve and being swingable within said opening between a latched position in engagement with said edge and a released position spaced outwardly from said edge, and a spring connected between said sleeve and said latch and urging the latter to swing toward said latched position.

20. An automatic assembly machine as defined in claim 19 in which downward movement of said chuck with said sleeve is stopped by said workpiece prior to the completion of the downward stroke of said driver thereby to cause the chuck to move upwardly relative to the sleeve as said downward stroke is continued, said latch snapping automatically to said latched position and lodging beneath said edge after upward movement of said chuck though a predetermined distance relative to said sleeve.

21. An automatic assembly machine as defined in claim 17 in which the lower end portion of said chuck is formed by at least two opposed sections cantilevered near their upper ends to swing toward and away from one another, means urging said sections away from one another to keep the chuck open for telescopically receiving a fastener, and mating cam surfaces on said sections and said sleeve engageable with one another as an incident to movement of said chuck to said lowered position and operable in response to such engagement to swing said sections toward one another into gripping embracement with the fastener.

22. An automatic assembly machine comprising a support, a power rotated driver mounted on said support for up and down movement, a first actuator for reciprocating said driver through upward and downward strokes, a chuck telescoped over said driver and mounted to move upwardly and downwardly with the driver and also to move vertically relative to the driver between raised and lowered positions, said chuck being disposed in said lowered position and holding a fastener beneath said driver when the latter is at the top of said upward stroke prior to the start of an operating cycle, said chuck moving upwardly relative to said driver and shifting to said raised position as the fastener is driven by said driver during said downward stroke, a latch for holding said chuck in said raised position during subsequent movement of said driver through said upward stroke, a transfer device movable inwardly and outwardly on said support between loading and delivery stations, said transfer device picking up a fastener at said loading station and delivering the fastener to a position beneath said chuck at said delivery station, a second actuator for moving said transfer device between said stations and operable to move the transfer device outwardly to said delivery station when said driver reaches the top of said upward stroke with said chuck disposed in said raised position, means on said transfer device for releasing said latch as the transfer device reaches said delivery station thereby to enable said chuck to move downwardly to said lowered position and pick up the fastener from said transfer device, and means controlling said second actuator and effecting inward movement of said transfer device to said loading station after the fastener has been picked up by said chuck and before operation of said first actuator to being another cycle and initiate the next downward stroke of said driver.

23. An automatic assembly machine as defined in claim 22 in which said transfer device comprises a slide guided on said support for inward and outward movement, a pair of opposed fastener holder jaws, connectors mounting said jaws on said slide to move inwardly and outwardly with the latter between said loading and delivery stations and mounting the jaws pivotally on the slide to swing through a limited range between open and closed positions, and means connecting said second actuator to said jaws and operable in response to operation of said second actuator when the jaws are in each station to first swing the jaws about said connectors until the jaws stop upon reaching one of the positions and being responsive to the force created by stopping of the jaws to thereafter act through said connectors and move said slide on said support so as to move the jaws from one station to the other.

24. An automatic assembly machine as defined in claim 22 further including coacting means movable with said driver and said transfer device and engageable with one another to prevent said second actuator from moving said transfer device outwardly to said delivery station until said driver has been retracted upwardly through a predetermined distance by said first actuator.

25. An automatic assembly machine as defined in claim 22 further including a track on said support for delivering fasteners to said loading station, a rotatable feeding wheel for delivering randomly oriented fasteners to said track, a rotatable clearing wheel for sweeping improperly oriented fasteners off of said track, a rotatable member mounted on said support, means connecting said second actuator to said rotatable member to turn the latter back and forth when said second actuator is operated to shift said transfer device inwardly and outwardly, first and second endless belt drives connecting said rotatable member to said feeding wheel and said clearing wheel, respectively, and first and second one-way clutches associated with said first and second drives, respectively, and operable to rotate said feeding wheel when said member is turned in one direction and to rotate said clearing wheel when said member is turned in the opposite direction while leaving each wheel idle during rotation of the other wheel.

26. An automatic assembly machine as defined in claim 22 further including a base, said support being mounted pivotally on said base for horizontal movement about at least two horizontally spaced upright axes, a fixture on said base for holding a workpiece beneath said driver, said fixture including an opening having upright side walls formed with open-sided recesses each corresponding positionally to a work point on the workpiece, a passage extending through one of said side walls and establishing communication between said opening and the outer side of said fixture, a finger mounted on said support for horizontal movement therewith, and a vertically extending locator pin carried on said finder and centered beneath said driver, said locator pin being movable horizontally through said passage and into said opening as an incident to moving said support horizontally and being adapted to seat in said recesses to locate said driver above the work points on said workpiece.

27. An automatic assembly machine comprising a base, a fixture on said base for holding a workpiece, said fixture including an opening having upright side walls formed with open-sided recesses each corresponding positionally to a work point on the workpiece, a passage extending through one of said side walls and establishing communication between said opening and the outer side of said fixture, an articulated support mounted pivotally on said base for horizontal movement about at least two horizontally spaced upright axes, a power rotated driver mounted on said support for up and down reciprocation, a finder mounted on said support for horizontal movement therewith, and a vertically extending locator pin carried on said finder and centered beneath said driver, said locator pin being movable horizontally through said passage and into said opening as an incident to moving said support horizontally and being adapted to seat in said recesses to locate said driver about the work points on said workpiece.

28. An automatic assembly machine as defined in claim 27 in which said finder is anchored rigidly to said support and is fixed against vertical movement relative to said support during operation of said machine.

29. An automatic assembly machine as defined in claim 27 in which said locator pin if fitted loosely within a vertically extending hole in said finder, and a series of angularly spaced screws extending radially into said hole with their inner ends in clamping engagement with said pin, said screws being adjustable radially to enable precise centering of said pin beneath said driver.

30. An automatically fed fastener driving device comprising a support member, and a power rotated driver mounted on said support member and operable to engage and turn a threaded fastener, the improvement in said device comprising, a sleeve telescoped over said driver for locating the fastener relative to the driver, said sleeve being mounted on said support member to slide back and forth relative to the driver between an advanced position in which one end of the sleeve projects a predetermined distance beyond the working end of the driver and a retracted position in which said end of the sleeve projects a lesser distance beyond the working end of the driver, a spring acting between said support member and said sleeve and urging said sleeve toward said advanced position, a releasable latch mounted on said support member and engageable with said sleeve to hold the sleeve in said retracted position against the bias of said spring, and means for delivering fasteners one at a time to a location beyond said one end of said sleeve when the sleeve is in said retracted position and operable as an incident to such delivery to release the latch to enable the sleeve to slide to said advanced position and to engage and control the delivered fastener.

*31. A machine comprising a support, a transfer mechanism movable back and forth on said support between a loading station and a delivery station and operable first to pick up a part at said loading station and thereafter to move to said delivery station to locate the part in the delivery station, said transfer mechanism comprising a slide guided on said support for back and forth movement, a pair of opposed part holding jaws, connectors mounting said jaws on said slide to move back and forth with the latter between said loading and delivery stations and mounting the jaws pivotally on the slide to swing through a limited range between open and closed positions, and actuator means connected to said jaws and operable when the jaws are in each station to first swing the jaws about said connectors until the jaws stop upon reaching one of said positions, said actuator means being responsive to the force created by stopping of the jaws and thereafter acting to move said slide on said support so as to move the jaws from one station to the other.*

*32. A machine as defined in claim 31 further including a pair of links each connected at one end to one of said jaws to pivot about an axis offset from the pivot axis of*

*the jaw, and said actuator means being connected to said links and being operable to shift said links to first swing said jaws between said positions and, with continued shifting of the links, to move said jaws between said stations.*

* * * * *